US012785991B2

(12) United States Patent
Schrijen et al.

(10) Patent No.: US 12,785,991 B2
(45) Date of Patent: Nov. 3, 2026

(54) HAMMING DISTANCE BASED MATCHING FOR PUF STRINGS

(71) Applicant: Synopsys, Inc., Sunnyvale, CA (US)

(72) Inventors: Geert Jan Schrijen, Roermond (NL); Roel Maes, Geel (BE)

(73) Assignee: Synopsys, Inc., Sunnyvale, CA (US)

( * ) Notice: Subject to any disclaimer, the term of this patent is extended or adjusted under 35 U.S.C. 154(b) by 3 days.

(21) Appl. No.: 18/851,681

(22) PCT Filed: Feb. 23, 2023

(86) PCT No.: PCT/EP2023/054599
§ 371 (c)(1),
(2) Date: Sep. 27, 2024

(87) PCT Pub. No.: WO2023/186414
PCT Pub. Date: Oct. 5, 2023

(65) Prior Publication Data

US 2025/0202720 A1 Jun. 19, 2025

(30) Foreign Application Priority Data

Mar. 28, 2022 (EP) .................................... 22164700

(51) Int. Cl.
*H04L 9/32* (2006.01)

(52) U.S. Cl.
CPC .......... *H04L 9/3278* (2013.01); *H04L 9/3234* (2013.01)

(58) Field of Classification Search
CPC ................. H04L 9/3278; H04L 9/3234; H04L 63/0853; G06F 21/34
See application file for complete search history.

(56) References Cited

U.S. PATENT DOCUMENTS 7,257,241 B2 * 8/2007 Lo ...................... G06V 40/1365
7,545,962 B2 * 6/2009 Peirce .................... G06V 40/10 713/186
10,025,831 B2 * 7/2018 Zhdanov ................ G16B 50/30
(Continued)

FOREIGN PATENT DOCUMENTS

EP 2191410 B1 10/2014
EP 3378054 A1 9/2018
(Continued)

OTHER PUBLICATIONS

G. Edward Suh et al,, "Physical Unclonable Functions for Device Authentication and Secret Key Generation," 2007, pp. 1-6. (Year: 2007).*
A. Sadr et al., "Weighted Hamming distance for PUF performance evaluation," 2013, p. 1-2. (Year: 2013).*
(Continued)

*Primary Examiner* — Luu T Pham
*Assistant Examiner* — Canh Le
(74) *Attorney, Agent, or Firm* — Fenwick & West LLP

(57) ABSTRACT

Some embodiments are directed to matching a received PUF string. For example, a matching enrollment PUF string may be found by searching for a matching enrollment PUF string in a database. The searching may include iteratively determining if a Hamming distance between the received PUF string and an enrollment PUF string retrieved from the database is below a threshold at least until a matching enrollment PUF string is found. The threshold depends on the specific retrieved enrollment PUF string and/or the received PUF string.

18 Claims, 9 Drawing Sheets

(56) References Cited

U.S. PATENT DOCUMENTS

| | | | | |
|---|---|---|---|---|
| 2003/0204743 | A1 | 10/2003 | Devadas et al. | |
| 2004/0193893 | A1* | 9/2004 | Braithwaite | G06F 18/28 713/186 |
| 2010/0245042 | A1* | 9/2010 | Tsubaki | G06F 21/32 340/5.82 |
| 2012/0183135 | A1* | 7/2012 | Paral | G09C 1/00 380/44 |
| 2018/0241557 | A1* | 8/2018 | Maes | H03M 13/19 |
| 2023/0216838 | A1* | 7/2023 | Plusquellic | H04L 9/3278 726/7 |

FOREIGN PATENT DOCUMENTS

| | | | |
|---|---|---|---|
| WO | WO 2009/024913 | A2 | 2/2009 |
| WO | WO 2011/018414 | A2 | 2/2011 |
| WO | WO 2012/069545 | A2 | 5/2012 |
| WO | WO 2017/084895 | * | 5/2017 |
| WO | WO 2017/084895 | A1 | 5/2017 |
| WO | WO 2019/011607 | A1 | 1/2019 |

OTHER PUBLICATIONS

Pavithra Ramesh et al., "Peer Pressure on Identity: ON Requirements for Disambiguating PUFs in Noisy Environment," 2017, pp. 1-4 (Year: 1017).*

"Efficient Fuzzy Extractor Implementations for PUF Based Authentication," 2017, pp. 1-7. (Year: 2017).*

PCT International Search Report, PCT Application No. PCT/EP2023/054599, May 19, 2023, 11 pages.

Zhou, C. et al., "Soft Response Generation and Thresholding Strategies for Linear and Feed-Forward MUX PUFs," Low Power Electronics and Design, ACM, 2 Penn Plaza, Suite 701, New York, NY, 10121-0701, USA, Aug. 8, 2016, pp. 124-129.

Van Der Leest, V. et al., "Hardware Intrinsic Security from D Flip-Flops," Scalable Trusted Computing, ACM, 2 Penn Plaza, Suite 701, New York, NY, 10121-0701, USA, Oct. 4, 2010, pp. 53-62.

Yang, K. et al., "14.2 A Physically Unclonable Function with BER <10-8 for Robust Chip Authentication Using Oscillator Collapse in 40nm," 2015 IEEE International Solid-State Circuits Conference—(ISSCC) Digest of Technical Papers, IEEE, Feb. 22, 2015, pp. 1-3.

* cited by examiner

500

HAMMING DISTANCE BASED MATCHING FOR PUF STRINGS

FIELD OF THE INVENTION

The invention relates to an identification method, an identification device, and a computer readable medium

BACKGROUND

A physical unclonable function exploits manufacturing variations to derive a digital identifier. The digital identifier is thus tied to a physical medium. Because the physical unclonable function depends on random process variation, it is easy to create a PUF but it is very hard, if not downright impossible, to create a PUF which would give rise to a particular predetermined identifier. The manufacturing variations lead to different physical characteristics, for example in a memory element. The physical characteristics may include: doping concentrations, oxide thickness, channel lengths, structural width, e.g., of a metal layer, parasitics, e.g., resistance, capacitance, etc. When a digital circuit design is manufactured multiple times, these physical characteristics will vary slightly and together they will cause the behavior of an IC element, e.g., a memory element, to behave differently in some situations. For example, the start-up behavior is determined by manufacturing variations in the physical characteristics.

The response of a PUF may be used to identify the PUF and by association the device in which it is embedded. The PUF response measured at a PUF, typically represented as a string, is also known as a fuzzy identifier. The fuzzy identifier identifies the PUF that it came from, but is fuzzy in the sense that on repeated measurement the identifier will not be bit-for-bit identical.

For some applications it is not necessarily problematic to have a fuzzy identifier. If the aim is identification, and this is possible, then it may not matter that the string used for identification is not exactly the same on each iteration. However, in many applications it can be problematic. For example, if the PUF device without a conventional fixed unique device identifier cannot interact with conventional systems, that expect such a fixed identifier. For example, storage of information associated with the PUF device is improved if the information can be stored in association with a fixed identifier rather than with a fuzzy identifier. For example, retrieval of the information is quicker if it uses a fixed identifier.

International patent application PCT/EP2016/076716, published as WO2017084895 with title "Puf identifier assignment and testing method and device" provides an advantageous way to assign fixed identifiers to fuzzy identifiers. The publication is included herein by reference. According to this publication, an assigning device is configured to assign fixed identifiers to fuzzy identifiers. The known assigning device comprises a database storing multiple database records, each database record storing a fuzzy identifier. When a fuzzy input identifier is received, a matching unit determines if a matching fuzzy identifier exists in the database that matches the fuzzy input identifier according to a matching criterion. If a match is found, a fixed identifier is determined from the database record storing the matching fuzzy identifier. If no matching fuzzy identifier is found, a database record may be added storing the fuzzy input identifier.

In this way, a PUF can be used to make uniquely identifiable devices, yet they can still be provided with a unique fixed device identifier. The known method may still be improved. In particular, the known device depends on a reliable matching between fuzzy identifiers in the database and the fuzzy input identifier.

SUMMARY OF THE INVENTION

It would be advantageous to improve the matching of received PUF strings, e.g., of received fuzzy input identifiers. This may be used to return a fixed identifier. For example, an improved matching may have a lower false acceptance rate and/or a lower false rejection rate.

An identification method may search for an enrollment PUF string that matches a PUF string received from a PUF device. The matching may comprise comparing the Hamming distance between the enrollment PUF string and the received PUF string with a matching threshold. In an embodiment, the identification method does not use the same matching threshold for all comparisons. False acceptance rate and/or false rejection rate is improved by using a matching threshold that is better adapted to the characteristics of the PUF device that produced the enrollment string, or received PUF string. For example, the matching threshold may be determined by applying a threshold setting function to a PUF string of the PUF device, preferably to the enrollment PUF string.

A matching unit according to an embodiment may use multiple different matching thresholds in the search, e.g., depending on the enrollment PUF string. Such a matching unit is better adapted in dealing with varying characteristics amongst the PUF devices, such as SRAM PUF devices. In an embodiment, the threshold value is variable and depends on statistical properties of the PUF string(s) produced by the PUF in the PUF device, e.g., in particular on the enrollment PUF string.

A matching threshold may be determined by a threshold setting function which may be applied to a PUF string, in particular, an enrollment PUF string. Such a function could be computed once, and the result stored in a database, or such a function could be applied at runtime, e.g., to an enrollment PUF string retrieved from the database, e.g., during a matching phase. In the latter case, the number of times the threshold setting function needs to be called can be reduced by first matching the received PUF string against the enrollment PUF string using an upper threshold. The upper threshold is chosen to be an upper bound of the specific matching threshold which depends on the specific retrieved enrollment PUF string and/or the received PUF string. For example, the upper threshold may be an upper bound of the threshold setting function. Only if the received PUF string matches with the enrollment PUF string using the upper threshold is the specific threshold needed, which specific threshold may then at runtime be computed by applying the threshold setting function to, e.g., the enrollment PUF string. The specific threshold is lower than the upper threshold for at least part of the received PUF string, though it may be equal to the upper threshold for a part of the received PUF strings as well.

In an embodiment, the matching threshold is computed from a measure for the corrected bias or deviancy of the PUF. The average absolute difference between the 1-probability of a bit and ½ of a PUF is referred to as the (average) deviancy. Average corrected bias is ½ minus the deviancy. Average corrected bias is a measure for the deviancy and vice versa. A measure for the deviancy is correlated with the deviance. In an embodiment, the measure is computed from one or more PUF strings, in particular the enrollment PUF string.

For example, in an embodiment, the measure for the deviance is computed by applying a first function to the enrollment PUF string, and the matching threshold is derived by applying a second function to measure for the deviancy. The second function may use a lookup function that maps ranges of the measure for the deviancy to a matching threshold. In an embodiment, two ranges are used, but there may be more than two ranges as well.

A suitable measure for the deviancy is the equal pair probability in a PUF string. To estimate the equal pair probability, the PUF string is portioned into a sequence of PUF string characters (typically bits). The equal pair probability is the portion of consecutive non-overlapping pairs in which the pair is equal, e.g., has two equal bits. The equal pair probability is a measure for the deviancy. Instead of the equal pair probability, the unequal pair probability can just as well be used.

It may happen that a received PUF string does not match any of the previously stored enrollment PUF strings. For example, an embodiment may be arranged to take an acceptance action if a match is found, and a non-acceptance action if no match is found. The non-acceptance action may include storing the received PUF string as an enrollment PUF string, so that it can be matched in future. The acceptance action and non-acceptance action may both include returning information to the PUF device that generated the received PUF string. The acceptance action and non-acceptance action may both include reporting the result of the search to an operator.

Embodiments include identification methods and identification devices, e.g., to better match received PUF strings with previously stored enrollment PUF strings-one of said enrollment PUF strings may or may not match an incoming PUF string. An identification device is an electronic device, e.g., a server. A PUF device is an electronic device, e.g., a low-resource device, e.g., a mobile device, etc. A PUF device may be a smart card. A PUF device may be an active or passive RFID tag. A PUF device may be a wireless, sensor device. For example, a PUF device may be part of a mesh network.

PUF identification according to an embodiment may be applied in a wide range of practical applications. For example, a PUF device, e.g., in the form of an integrated circuit, may be embedded in objects as a tracking device. In a particular example, the object and the PUF device may both be an integrated circuit, e.g., a PUF device may be part of an integrated circuit which is also configured for other purposes.

For example, this may be usefully employed in a manufacturing process or the like. For example, the PUF device may provide an ID for logging information of the manufactured objects, e.g., ICs, at multiple stages in the manufacturing process. This can even be done if the PUF devices or objects do not have memory to store a unique identity value or when provisioning of a unique identity is too costly. PUF devices can further be used for supply chains, logging of stages in a supply chain, anti-counterfeiting, especially of electronic components, device tracking in the field, etc.

An embodiment of the identification method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of a Hamming distance distribution for two sets of PUF devices, FIG. 2*a* schematically shows an example of an embodiment of an identification device, FIG. 2*b* schematically shows an example of an embodiment of a PUF device, FIG. 2*c* schematically shows an example of an embodiment of a PUF device identification system, FIG. 3*a* schematically shows an example of an embodiment of a PUF device identification system, a PUF device and an identification device, FIG. 3*b* schematically shows an example of an embodiment of a threshold setting function, FIG. 3*c* schematically shows an example of an embodiment of an identification device, FIGS. 4*a*-4*e* schematically show examples of an embodiment of a database, FIG. 5 schematically shows an example of an effective bit error rate, FIG. 6*a* schematically shows an example of an embodiment of a biased PUF response, FIG. 6*b* schematically shows an example of an embodiment of bias mask patterns, FIG. 7 schematically shows an example of equal pair ratio as function of one-probability, FIG. 8*a* schematically shows an example of an embodiment of an identification method, FIG. 8*b* schematically shows an example of an embodiment of an identification method, FIG. 9*a* schematically shows a computer readable medium having a writable part comprising a computer program according to an embodiment, FIG. 9*b* schematically shows a representation of a processor system according to an embodiment.

LIST OF REFERENCE NUMERALS

Figure 1:
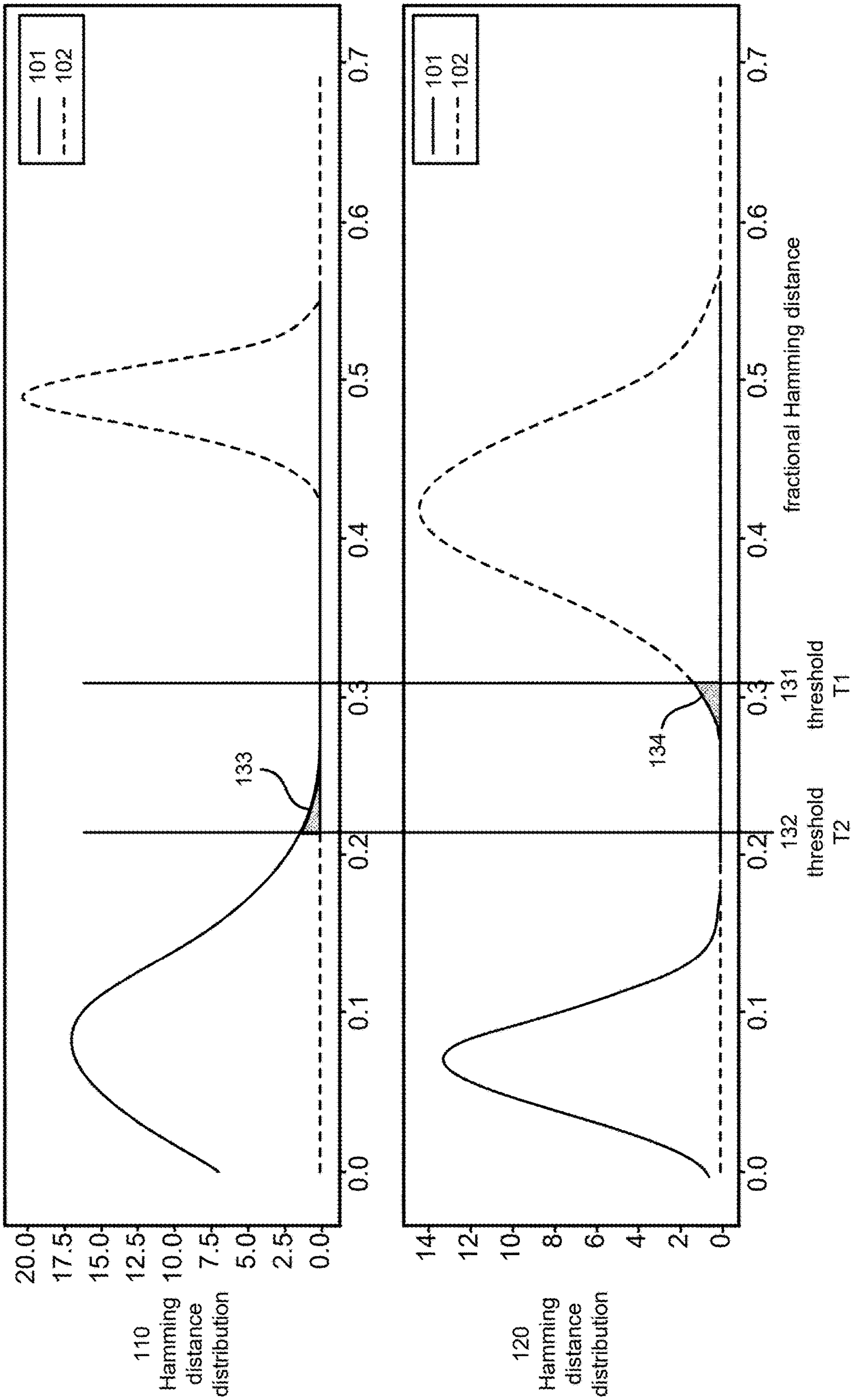

| | |
|---|---|
| 101 | within class Hamming distance |
| 102 | between class Hamming distance |
| 110 | a Hamming distance distribution for a device of a first type |
| 120 | a Hamming distance distribution for a device of a second type |
| 131 | a first threshold T1 |

-continued

| | |
|---|---|
| 132 | a first threshold T2 |
| 133 | FRR with threshold T2 |
| 134 | FAR with threshold T1 |
| 200 | a PUF device identification system |
| 210, 210.1, 210.2 | a PUF device |
| 230 | a processor system |
| 240 | storage |
| 250 | communication interface |
| 255 | a PUF |
| 260 | an identification device |
| 262 | a database |
| 270 | a processor system |
| 272 | a computer network |
| 280 | a storage |
| 290 | a communication interface |
| 300 | a PUF identification system |
| 312 | a database |
| 321, 324 | a PUF device |
| 322, 325 | a PUF |
| 323, 326 | a PUF response |
| 330, 331 | an identification device |
| 340 | a receiver |
| 341 | a received PUF string |
| 342 | a sender |
| 350 | a PUF string comparison unit |
| 351 | an accept unit |
| 352 | an enrollment unit |
| 360 | a search unit |
| 361, 366 | a PUF comparison input |
| 362 | an enrollment PUF string |
| 363 | a matching threshold |
| 364 | stored information |
| 365 | a lower threshold |
| 370 | a threshold setting function |
| 371 | an enrollment PUF string |
| 372 | a matching threshold |
| 500 | a graph of effective bit error versus Pbias |
| 501 | Trendline showing relationship between effective bit error and Pbias |
| 502 | Simulated data points of effective bit error versus Pbias |
| 611-614 | a PUF string |
| 621-624 | a mask |
| 701 | equal pair ratio as function of one-probability for M > 1 |
| 702 | equal pair ratio as function of one-probability for M = 1 |
| 1000 | a computer readable medium |
| 1010 | a writable part |
| 1020 | a computer program |
| 1110 | integrated circuit(s) |
| 1120 | a processing unit |
| 1122 | a memory |
| 1124 | a dedicated integrated circuit |
| 1126 | a communication element |
| 1130 | an interconnect |
| 1140 | a processor system |

DETAILED DESCRIPTION OF EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

FIG. 1 schematically shows an example of a (relative) Hamming distance distribution 110 for a first set of PUF devices of a first type and a Hamming distance distribution 120 for a second set of PUF devices of a second type. The two types of PUF devices are similar in that both comprise a PUF configured to generate a PUF response, typically converted into a PUF string, typically a binary string. The PUF strings of the two types of devices are of the same length. The Hamming distances are typically shown relative to the distance; that is Hamming distances are divided by the length, to arrive at a value in the range 0 . . . 1. FIG. 1 also shows relative Hamming distance. Relative Hamming distance is also referred to as fractional Hamming distance. In embodiments, Hamming distance could be expressed in absolute terms or relative, this makes no difference.

A problem that was found in practice is that in a population of PUF devices, multiple types of PUF devices may be mixed. Different type PUF devices may have different characteristics, but may not otherwise be distinguishable. In particular, their Hamming distance distribution may be different.

The Hamming distance distribution shows the distribution of Hamming distances between PUF strings received from different devices though of the same type—the between class Hamming distance 102—and the distribution of Hamming distances between PUF strings received from the same device—the within class Hamming distance 101. The horizontal axis of Hamming distance distributions 110 and 120 shows the fractional Hamming distance. For example, if two PUF strings are each 2048 bits long, then a fractional distance of 0.7 implies a Hamming distance of 0.7*2048=1434 (rounded). The vertical axis of Hamming distance distributions 110 and 120 indicates the number of PUF strings that have the indicated fractional Hamming distance; These can be regarded as indicative of a probability density of pairs of PUF strings with the indicated Hamming distance between them. Note that for a true probability density the graphs may be scaled.

Note in both Hamming distance distributions, that the typical Hamming distance to a given different PUF string is centered around a fractional Hamming distance of 0.5 or near 0.5. Due to some bias in the bits to or away from one, the modal fractional Hamming distance might not be exactly 0.5. When comparing two PUF strings that come from the same device, this is curve 101, the typical fractional Hamming distance is much lower. In this example, around a fractional Hamming distance of 0.1.

To use a PUF device for identification one can set a matching threshold in between the locations of the within-class Hamming distance distribution and the between-class Hamming distance distribution. For example, a threshold T1, shown at 131, may be set for the devices of type 1 in plot 110. As can be seen in the figure, the within-class distribution is virtually entirely above threshold T1, while the between-class distribution is virtually entirely below threshold T1. So to identify a device one can obtain a PUF response and compare it to a previously obtained enrollment response. If the fractional Hamming distance is below T1, then it is deduced that the obtained PUF response and the enrollment PUF response came from the same device, while if the fractional Hamming distance is above T1, then it is deduced that the PUF responses did not come from the same PUF device. Instead of expressing the thresholds in terms of fractional Hamming distances, one can equally use absolute Hamming distances.

In case of devices of type 2 in plot 120, with the distribution 120 the situation is similar. However, as the distributions are slightly different the ideal value for the matching threshold T2, shown at 132 is also different.

In this example, the first type of PUF devices have PUF properties resulting in a maximum noise between measurements of around 20% (bit error probability pe=0.2) and a probability of individual bits starting up as a one of around 50% (p1=0.5). The second type of PUF devices may show a maximum noise between measurements of around 12% (pe=0.12) but with a stronger bias resulting in a probability of bits starting up as a one of p1=0.42.

For both of these individual distributions a different ideal matching threshold value T would be computed. The selected matching threshold T1 for type 1 PUF device is higher than the selected matching threshold T2 for PUF device type 2.

Now the problem arises when both types of PUF devices are part of the same population but are identified with a single matching threshold. For example, if the matching threshold T1 based on the data of type 1 PUF devices were used, then this would result in a high FAR (False Acceptance Rate) for devices of type 2. The FAR for type 2 devices is indicated in distribution 120 as shaded region 134.

On the other hand, if the matching threshold T2 based on the data of type 2 PUF devices were used, then this would result in a high FRR (False Rejection Rate) for devices of type 1. The FRR for type 1 devices is indicated in distribution 110 as shaded region 133.

In an embodiment, the PUF type is obtained for a received PUF string. For example, the PUF type may be derived from characteristics of the received PUF strings and/or may be derived from further information received from the PUF device. The PUF type may in turn be used to set the matching threshold, e.g., through a look-up table mapping PUF type to matching threshold.

Unfortunately, in practice, it may not be straightforward to distinguish between different type PUF devices, especially with limited or no physical access to the PUF device. There is therefore a desire to set suitable matching threshold in the absence of PUF type information. Different devices may use, e.g., a PUF component, e.g., a volatile memory or the like, that was sourced from a different manufacturer, or which may just have been manufactured under different manufacturing conditions. As PUF based identification exploit subtle physical differences between otherwise identical devices, a changed manufacturing process can easily become relevant. This means, in practice, that a PUF device population may comprise, say, both devices with a high bias, but with low noise and devices with a low bias but with more noise.

In an embodiment, this situation is addressed by matching PUF strings with different matching thresholds. For example, enrollment PUF strings that show low bias are matched with a high threshold, whereas enrollment PUF strings that show high bias are matched with a low threshold.

It is possible to compute an appropriate matching threshold from the enrollment PUF string, and such techniques are discussed herein. This is useful in the practically common situation in which PUF device type is not known, and cannot be determined directly. Matching using multiple thresholds may however also be used in situations in which PUF type can be determined during enrollment, but not during the later matching phase. For example, if enrollment is done in a controlled environment, then chip-type, say, can be determined, or multiple enrollment strings can be compared. Such information may then be used to determine an appropriate matching threshold for that particular PUF device, and stored in the database. Unfortunately, during manufacture utilizing a device as a PUF device may not yet be done. Furthermore, such extended storage of information during manufacture may be at odds with the low-cost, low-resource PUF devices that may be used. In particular, obtaining an enrollment PUF string during manufacture may be undesirable, as it represents a significant additional cost. That is, the enrollment PUF string may not be received at an identification device until the device is used in the field, that is after the device left manufacture. The upshot being that no other information may be available for setting appropriate matching threshold than the PUF enrollment string, whenever it is received.

Figure 2A:
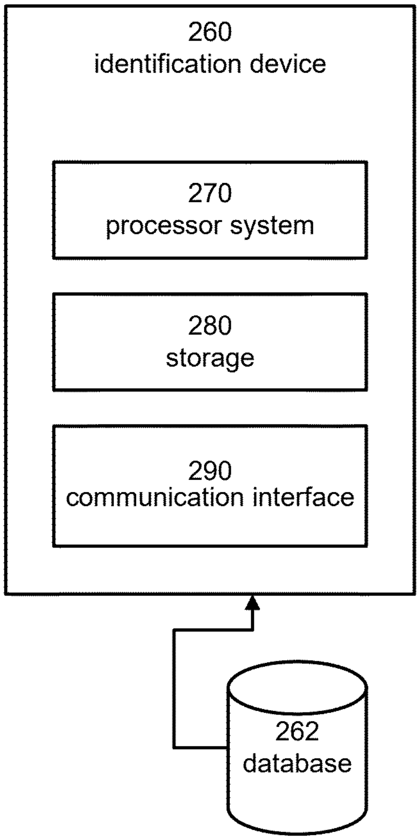
Figure 2B:
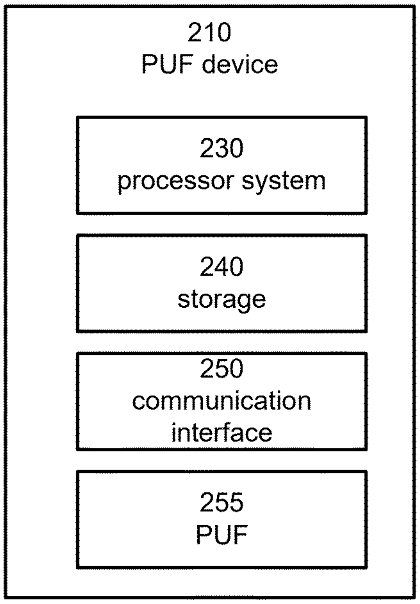

FIG. 2*b* schematically shows an example of an embodiment of a PUF device 210. FIG. 2*a* schematically shows an example of an embodiment of an identification device 260. PUF device 210 and identification device 260 may be part of a system 200.

PUF device 210 comprises a PUF 255 configured to generate a PUF string. The PUF string is suitable for identifying the PUF device from amongst multiple PUF devices, e.g., PUF devices such as PUF device 210. PUF device 210 is configured to measure a response from PUF 255 and provide it to identification device 260. Typically, this is done at least once during an enrollment phase, in which the enrollment PUF string is measured and stored at the identification device. Later PUF 255 may be queried again, and the resulting PUF string may be provided to the identification device 260 in a matching phase.

The identification device 260 is configured to identify a PUF device on the basis of a PUF string received from a PUF device, such as PUF device 210. For example, identification is done on the basis of a similarity between an enrollment PUF string and a later received PUF string, e.g., these strings having a Hamming distance below a matching Hamming distance. For example, the system 200 may be used to identify PUF devices amongst a large population of PUF devices even if these PUF device have no other identification.

PUF device 210 may comprise a processor system 230, a storage 240, and a communication interface 250. Identification device 260 may comprise a processor system 270, a storage 280, and a communication interface 290. Storage 240 and 280 may be, e.g., electronic storage, magnetic storage, etc. The storage may comprise local storage, e.g., a local hard drive or electronic memory. Storage 240 and 280 may comprise non-local storage, e.g., cloud storage. In the latter case, storage 240 and 280 may comprise a storage interface to the non-local storage. Storage may comprise multiple discrete sub-storages together making up storage 240, 280. Storage may comprise a volatile writable part, say a RAM, a non-volatile writable part, e.g., Flash, a non-volatile non-writable part, e.g., ROM. Storage 240 and PUF 255 may share memory. For example, in an embodiment, the start-up noise in a volatile RAM may be used as a PUF string. After the PUF string has been used for the enrollment or matching phase, the memory may be used as regular volatile memory. The regular use of a volatile memory after use as a PUF is not optimal for long term preservation of the memory's PUF properties, e.g., to avoid drift of the start-up noise, though for some applications this may not be an issue. In any case, up to a point a lower reliability of a PUF can be countered with a longer PUF string, e.g., more Identification device 260 may have access to a database 262. Database 262 may comprise enrollment PUF strings for multiple PUF device, possibly including PUF device 210.

The devices 210 and 260 may communicate internally, with each other, with other devices, external storage, input devices, output devices, and/or one or more sensors over a computer network. The computer network may be an internet, an intranet, a LAN, a WLAN, etc. The computer network may be the Internet. The devices 210 and 260 comprise a connection interface which is arranged to communicate within system 200 or outside of system 200 as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna.

The communication interface 250 may be used to send or receive digital data, e.g., to send a PUF string to identification device 260, e.g., during enrollment or during matching. Communication interface 250 may be used to send other data as well, e.g., sensor values. For example, a PUF device may comprise one or more sensors, measured values of which may be communicated to identification device 260. The PUF string may be used to identify the PUF device from which the sensor values are coming.

The communication interface 290 may be used to send or receive digital data, e.g., to PUF device 210. For example, identification device 260 may communicate to PUF device 210 that the data transfer was successful, that the device was enrolled or identified, request a retransmission of data, and so on. For example, identification device 260 may communicate to PUF device a fixed identifier associated by identification device 260 with the received PUF, e.g., through matching with an enrollment string, or enrolling the received PUF string. For example, identification device 260 may communicate to PUF device 210 instructions, e.g., command, e.g., computer commands. The command may instruct the movement of an actuator, the configuration of a sensor, or the like. For example, identification device 260 may communicate to the PUF device cryptographic information, e.g., a key, allowing the PUF device to decrypt information, e.g., information stored in a storage of PUF device 210. For example, identification device 260 may communicate to the PUF device so-called helper data, allowing the PUF device to error-correct a further PUF string at the PUF device, which in turn may be used as a cryptographic key.

The communication interface 290 may be used to communicate with multiple identification devices.

The execution of devices 210 and 260 may be implemented in a processor system. The devices 210 and 260 may comprise functional units to implement aspects of embodiments. The functional units may be part of the processor system. For example, functional units shown herein, e.g., in FIGS. 3*a*-3*c*, may be wholly or partially implemented in computer instructions that are stored in a storage of the device and executable by the processor system.

The processor system may comprise one or more processor circuits, e.g., microprocessors, CPUs, GPUs, etc. Devices 210 and 260 may comprise multiple processors. A processor circuit may be implemented in a distributed fashion, e.g., as multiple sub-processor circuits. For example, devices 210 and 260 may use cloud computing.

Typically, the PUF device 210 and identification device 260 each comprise a microprocessor which executes appropriate software stored at the device; for example, that software may have been downloaded and/or stored in a corresponding memory, e.g., a volatile memory such as RAM or a non-volatile memory such as Flash.

Instead of using software to implement a function, the devices 210 and/or 260 may, in whole or in part, be implemented in programmable logic, e.g., as field-programmable gate array (FPGA). The devices may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc. In particular, PUF device 210 and identification device 260 may comprise circuits, e.g., for cryptographic processing, and/or arithmetic processing.

In hybrid embodiments, functional units are implemented partially in hardware, e.g., as coprocessors, e.g., arithmetic or cryptographic coprocessors, and partially in software stored and executed on the device.

As said, physical unclonable functions exploit manufacturing variations to derive a digital identifier, which is thus tied to a physical medium.

For example, it has been observed that the startup behavior of volatile memory elements, demonstrate PUF like behavior. When such memory is powered-up, it contains content, i.e., comprise a sequence of data values, which depends on the at least partially random physical characteristics of the components, e.g., gates or transistors, which make up the memory, e.g., their physical arrangement relative to each other. If the memory is powered-up multiple times, it would contain, up to a large percentage, the same content.

The amount of change between subsequently produced noisy bit strings differs between different types of PUF. The noisy bit string is stable enough and long enough to identify the PUF amongst the population of PUFs that it is part of, e.g., that may potentially connect to an identification device. The length of the noisy bit string of the PUF may be chosen with respect to the error percentage of the PUF and/or the bias level of the PUF, etc.

PUF 255 may require a power-cycle, e.g., a power-down followed by a power-up to produce the noisy bit string again. The power-up signal may be regarded as a challenge. In device 210, typically, PUF 255 produces the noisy bit string at least twice. Once during the enrollment-phase, PUF 255 produces a first noisy bit string. Later during a use-phase of matching-phase PUF 255 produces a second noisy bit string. The first and second noisy bit strings are sufficiently close to each other, e.g., the Hamming weight of their difference is less than a threshold.

PUFs are random functions bound to a physical device in such a way that it is computationally infeasible to predict the output of the function without actually evaluating it using the physical device. Furthermore, as the PUF is realized by a physical system it is hard to clone. Physical systems that are produced by a production process that is not fully controlled (i.e. that contains some randomness) turn out to be good candidates for PUFs. In an embodiment, PUF 255 and thus PUF device 210 may be uniquely identified based on the response provided by PUF 255.

The PUF's physical system is designed such that it interacts in a complicated way with stimuli and leads to unique but unpredictable responses. The stimuli of a PUF are referred to as the challenge. Some PUF allow a larger range of different challenges, producing different responses. A PUF challenge and the corresponding response are together called a Challenge-Response-Pair. However, a PUF may also have a single challenge. PUF 255 may be a single-challenge PUF. PUF 255 may also be a multiple-challenge PUF. In the latter case, PUF 255 is challenged with the same challenge or set of challenges when producing the noisy bit string, in particular when producing the first and second noisy bit string.

A suitable source of PUFs are formed by an electronic volatile memory that contains, upon power-up, a response pattern of power-up values useful for identification of the memory, the response pattern depending on physical characteristics of the memory elements.

One known example of a PUF used to uniquely identify a device is the so-called SRAM PUF, which is based on the fact that, when an SRAM cell is powered-up it starts up in a random state due to variations in the threshold voltages of the transistors, which, in turn, are due to doping variations. When this is done multiple times, each cell will start up in the same state most of the time. These PUFs may be realized on any device having SRAM memory on board.

Any memory showing a random start-up behavior which is sufficiently stable for identifying the memory is called a challengeable memory. As the start-up behavior is random, two different memories will have a large difference in their start-up memory pattern; as the start-up behavior is stable two start-up memory patterns of the same memory will have a small difference. Examples of such memories are SRAM memory cells as mentioned but also memory elements like flip-flops. Actually, any type of volatile memory may be used that comprises feedback loops.

A second kind of SRAM based PUFs can be constructed with Dual Port RAM. By writing on both ports at the same time different information, the memory cell is brought into an undefined state and shows a PUF-like behavior. This kind of PUF is described in more detail in WO2009024913. Other so-called Intrinsic PUFs are based on delay phenomena, see, e.g., US20030204743. A PUF may be constructed by simulating an SRAM memory cell on an FPGA, e.g., by cross-coupled invertors or latches, the so-called butterfly PUF see European patent EP2191410 B1 and WO2011018414A2. PUF 110 may be a physical unclonable function comprising a plurality of bus-keepers, e.g., as described in WO2012069545. Many other types of PUF devices may be used, including Ring-oscillator PUF, Arbiter PUF, Optical PUF, and so on.

The length of the PUF string will depend on many factors, e.g., and increases, e.g., with the size of the population, the amount of noise, the amount of bias. As an example, a PUF string may be at least 128, 256, 1024, 2048 characters, typically bits, etc.

A PUF provides unpredictable and device-unique responses, yet due to their physical origin, these may be subject to measurement noise, and environmental influences. The PUF response may be used for identifying the PUF as described herein. Other applications of the PUF may be the production of a cryptographic key, typically from another part of the PUF, e.g., the PUF string for cryptographic key production is independent from the string used for identification. That former PUF string will also have noise, which is undesirable for a cryptographic key. One way to address noise is the use of so-called fuzzy extractors. A fuzzy extractor is able to transform a 'noisy' random value into a reliable key. An error correction procedure can be used in this process to correct for these fluctuations, and make sure an identical key is derived, each time the PUF is used. The error correction procedure uses so-called helper data. Helper data is also called noise reduction data. The helper data may be received at a PUF device from an identification device in response to a successful identification. Helper data may comprise redundancy information for an error correction procedure. Helper data may also comprise debiasing information. Additional information may be found, e.g., in international patent publication WO2019011607. Helper data may be computed from the enrollment string, e.g., by the identification device. In an embodiment, helper data is computed from a further PUF string local to a PUF device. The local further PUF string is not shared with the identification device, but the locally computed helper data may be sent to the identification for storage. When a match is made on a received PUF string, the stored helper data can be returned to the PUF device. The PUF device may use the received helper data and a recomputed version of the further PUF string to recompute data, typically a cryptographic key. The cryptographic key may be a private key, e.g., an ECDSA key. The PUF device may use the private key to recompute the corresponding public key. In this way, a PUF device may use asymmetric cryptography even though it is not capable of locally storing a private key.

Figure 2C:
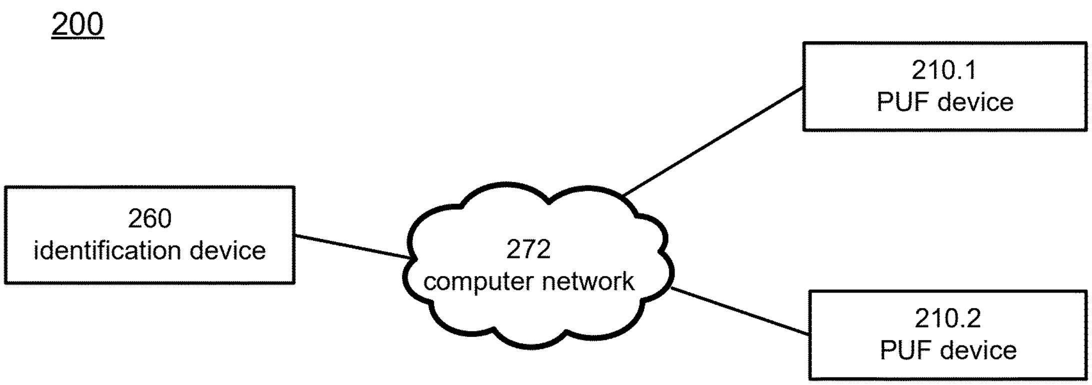

FIG. 2*c* schematically shows an example of an embodiment of a PUF identification system 200. System 200 may comprise multiple PUF devices; shown are PUF device 210.1 and 210.2. System 200 may comprise an identification device; shown is identification device 260. System 200 could comprise multiple identification devices. The devices are connected through a computer network 272, e.g., the Internet. The client and identification device may be according to an embodiment.

For example, in an embodiment, the multiple PUF device are low resource devices, e.g., sensor devices, or internet of things devices. The multiple PUF devices may all be manufactured according to the same specification, or at least may all comprise a PUF according to the same devices. Interestingly, although the PUF devices are not explicitly personalized, they can still identify themselves using a PUF embedded in the device. For example, if an SRAM memory is present in the PUF device then start-up noise may be used as a PUF response, e.g., a PUF string, while later the same memory may be used for other purposes. In this way, network of identifiable devices may be created using particularly few resources.

Unfortunately, it may happen that the characteristics of the PUF may vary. For example, a new version of a chip used in the PUF device may have a different bias or noise or the like. For example, a new set of devices may use SRAM chips of a different manufacturer, or the layout of the SRAM device may be slightly different, etc. Such differences may be identifiable, e.g., a version number may be present in a ROM of the device. Typically though, one cannot easily tell what PUF characteristics a device might have, especially not without access to the PUF.

Figure 3A:
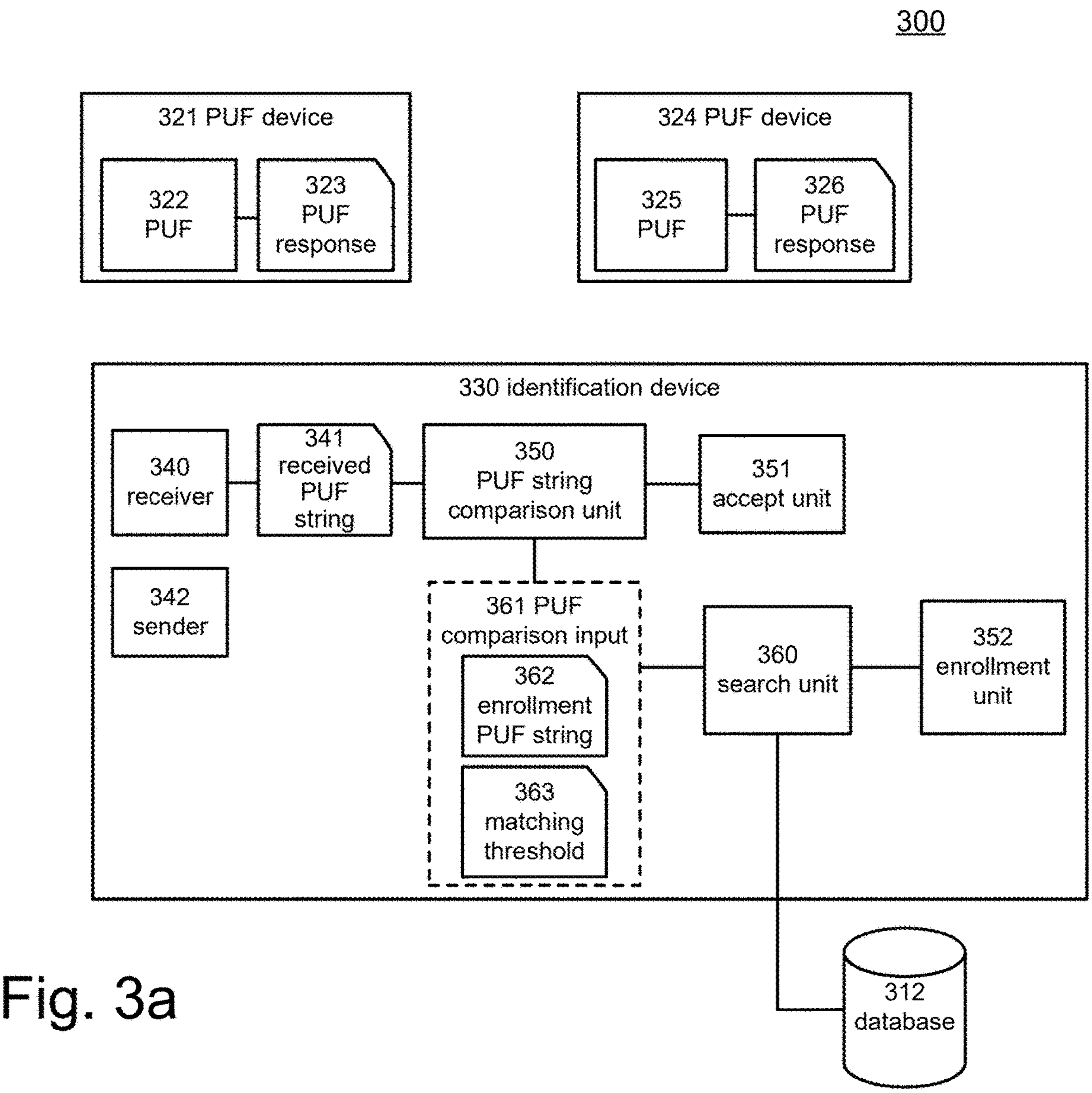

FIG. 3*a* schematically shows an example of an embodiment of a PUF device identification system 300, multiple PUF devices and an identification device 330.

PUF identification system 300 comprises multiple PUF devices. Two PUF devices are shown: PUF device 321 and PUF device 324. Typically, the number of PUF devices is higher; typically considerably higher, e.g., at least 10, 100, 1000, 10000, etc. The PUF devices comprise a PUF, viz., PUF 322 and PUF 325. The PUFs are configured to produce a PUF response when required. The PUF response is typically converted into a PUF string.

The raw PUF response may or may not be accessible itself. For example, the PUF may be a capacitor PUF, in which case, it may be configured to provide the raw capacity value, which then may be converted to a digital value. Multiple values may be concatenated into a string. Such a PUF has the advantage that may be queried multiple times, without rebooting the device. In this case, the individual values in the string may be quaternary for example. Such an embodiment may use PUF strings composed of quaternary characters, e.g., base 4 digits-more generally base n digits. On the other hand, in case of say a volatile memory based PUF, such as an SRAM, only the PUF string, e.g., the contents of the SRAM on start-up may be available. For a memory based PUF, a PUF string is naturally considered as a binary string, though any string could be converted to a binary string if desired.

The PUF devices will typically be configured for additional functionality beyond their PUF functions. For example, the PUF devices may be part of a sensor system, a surveillance system, an Internet of things system, and so on. It is desired that a PUF device can identify itself, preferably without personalizing the PUF devices.

The PUF devices may also be employed as anti-counterfeiting devices. For example, a PUF device may be included in another device for which counterfeiting is to be detected. As PUF devices are not easily copied, the presence of a PUF device that was validly enrolled, can be taken as an indication that the device in which it is included is valid as well. For example, such anti-counterfeiting may be included, in consumer goods, e.g., shoes, bags, or in media, such as consumer media, e.g., optical media, computer readable media and the like.

The PUF devices are configured to obtain a PUF string from their PUF. Shown in the figures are PUF string 323 from PUF 322 and PUF string 326 from PUF 325. Note that two PUF strings, obtained twice from the same PUF, are typically not identical. Although their differences are small enough to make meaningful identification possible, they are nevertheless almost never the same. Typically, the initial PUF string read from a PUF and recorded in an identification device, is referred to as the enrollment PUF string. Later PUF strings are compared against the enrollment string to determine if they were obtained from the same PUF or not. The PUF devices are also configured to transfer their PUF response to the identification device. This may be with or without additional data, e.g., additional data related to other functionality of the PUF. In an anti-counterfeiting application, say, such additional data is possible, but may not be needed. For example, the PUF devices may have network functionality to transfer the PUF string. For example, the PUF device may be configured to the PUF string to be read out, e.g., wireless, e.g., using NFC or the like, or wired, e.g., through a connector temporarily connected to the PUF device.

PUF identification system 300 comprises an identification device 330. Identification device 330 is configured for matching a received PUF string against a database 312.

Identification device 330 comprises a receiver 340 configured to receive a PUF string 341. The PUF string has been obtained by measuring an external PUF device. The identification device is to determine if received PUF string 341 matches one of the previously stored enrollment PUF strings, or not.

For example, the external PUF string may be obtained from a measured PUF response from a PUF in a corresponding PUF device. In a suitable PUF devices the PUF response can be represented as a PUF string, which is furthermore sufficiently unique to identify the PUF device in its population.

The PUF devices and the identification device may use various types of PUF. For example, a suitable PUF technology is based on volatile memory. For example, the start-up pattern in a volatile memory can be taken as a PUF string. SRAM memory is very suitable for use a PUF. Other examples are described herein, e.g., a Bus keeper PUF, a Butterfly PUF, etc. Typically, all the PUFs in the population of PUF devices is the same, even the may partition into multiple types. For example, the population may comprise multiple PUF devices each comprising a volatile memory based PUF, e.g., each comprising an SRAM PUF. Said population may still comprise multiple types though. This is not necessary however, and the population may comprise PUFs of different technology. In such a case, the varying characteristic problem is likely to be even more severe.

The enrollment PUF strings are typically stored in a database 312. Database 312 comprises multiple previously obtained enrollment PUF strings of multiple external PUF devices. Various formats and examples for database entries may be used and are described herein.

It may be the case that the database is complete, in the sense that all PUF devices in the population are enrolled, that is, have an enrollment PUF string in database 312. For example, this may be achieved if enrollment is part of the manufacturing process. This is not necessary, or even typical, there may be PUF devices in the population that have not yet registered. In that case, identification device 330 will legitimately find that a PUF device is not found in the database; as a follow-up action, an enrollment procedure may be followed.

Database 312 may be implemented as part of the identification device; This is the typical use case. It is not necessary though. For example, identification device 330 may comprise a database interface configured for accessing the database. The database may be implemented, e.g., in another server, in another location, as a cloud service, and so on. For example, multiple identification devices may use a single database. Using a local database has the advantage of a quicker response time, which is an advantage for searching through the database.

Identification device 330 comprises a receiver 340 configured to receive a PUF string 341. PUF string 341 has been obtained previously by measuring an external PUF device, e.g., one of the multiple PUF devices. Examples of receiver 340 are given herein; e.g., it may be a communication unit. The receiver may be wired or wireless.

For example, identification device 330 and the PUF devices may be configured for an identification protocol, in which the PUF device sends a PUF string locally measured from its PUF to identification device 330. Such a protocol may comprise additional measures, e.g., aimed at robustness, e.g., error detection and correction, e.g., a checksum over protocol message(s), aimed at security, or the like. For example, the PUF device may additionally authenticate itself using conventional cryptographic means. For example, a PUF device may comprise a symmetric or asymmetric cryptographic key, and prove to the identification device that it poses said key using an authentication protocol, e.g., a challenge-response protocol, a zero-knowledge protocol, or the like. Note that this may even be used if the PUF devices are not personalized. For example, all or many manufactured PUF devices may receive the same key. Proving possession of such a key may be used as a first indication of the legitimacy of the PUF device. Additional measures, whether for error control or security are not necessary though.

Identification device 330 is configured to match the received PUF string 341 against the enrollment PUF strings in database 312. Finding a match indicates that the PUF string was obtained from the same PUF that was previously used to provide the enrollment PUF string. For example, in an anti-counterfeiting application, a match may indicate that the object in which the PUF device is embedded is genuine.

For example, a match may be used as an alternative for a device identifier. It is an advantage of system 300 that PUF devices can be uniquely identified without having to personalize the PUF device with a unique identifier.

Identification device 330 may comprise a search unit 360 and a PUF string comparison unit 350.

Search unit 360 is configured to search for a matching enrollment PUF string in the database. For example, search unit 360 may be configured to iteratively retrieve an enrollment string from database 312. This may be done sequentially, e.g., in an order in which the enrollment PUF strings are stored in records of the database, but other orders are possible. Enrollment PUF strings may be retrieved for example in a random order. For example, in an embodiment, search unit 360 is configured to search first through enrollment PUF strings that have recently been queried from database 312. For example, in an embodiment, search unit 360 is configured to cache enrollment strings from database 312, and to search first through the cached enrollment PUF strings. The latter option also works well when the database is not local to identification device 330.

Once an enrollment PUF string has been retrieved from database 312, it is matched against the received PUF string 341. FIG. 3*a* shows enrollment string 362, which was retrieved from database 312 by search unit 360. Matching is done by PUF string comparison unit 350. The comparison unit takes as input two PUF strings: the received PUF string 341 and the retrieved enrollment PUF string 362. In addition, comparison unit 350 uses matching threshold 363. Received PUF string 341 is determined to match retrieved enrollment PUF string 362 if the Hamming distance between received PUF string 341 and retrieved enrollment PUF string 362 is below the matching threshold 363. An identification unit may additionally consider the two PUF strings to be matching if their Hamming distance equals the matching threshold; this is not required.

If comparison unit 350 finds a match, e.g., a sufficiently low Hamming distance between received PUF string 341 and retrieved enrollment string 362, e.g., a Hamming distance below 363 then an acceptance action may be performed by identification device 330. Interestingly, the matching threshold 363 is not the same for all comparisons made by comparison unit 350, and/or is not the same for all comparisons requested by search unit 360. By using different matching thresholds the problem illustrated with reference to FIG. 1, e.g., that a constant matching threshold may be too high for some PUF devices or too low for some other PUF devices is avoided. Obtaining the matching threshold to use, and/or how to determine it, is further discussed herein.

The acceptance action may be defined differently for different applications. For example, identification device 330 may comprise an accept unit 351 configured for the acceptance action. The PUF device that generated PUF string 341 is referred to as the matching PUF device.

For example, accept unit 351 may be configured to return information to the PUF device that sent the PUF string 341. For example, sending information may be done using a sender 342, which may be part of the identification unit 330. For example, sender 342 and receiver 340 may together form a communication unit. Sender 342 may be wired or wireless. Typically, the communication modality of sender 342 is the same as that of receiver 340, though that is not necessary.

For example, in an identification application, accept unit 351 may send information stored in the database associated with the matching enrollment PUF string to the matching PUF device. For example, a particularly useful application is to store a unique device identifier with the enrollment string and to return the unique device identifier to the matching PUF device. Future communication by the PUF device can then use its device identifier. For example, the PUF device may engage in communication with other devices, including PUF devices, servers, and the like, referring to its device identifier. In this way the PUF devices are identifiable in a manner that is compatible with conventional protocols, e.g., as if the PUF device was personalized with its own unique device identifier. The PUF device can continue to use its identifier so long as it stores the number. Should the number be lost, e.g., due to a reboot, the PUF device can reacquire the number from identification device 330; for example, the PUF string may be queried again, which may be used to obtain the number again from identification device 330.

Instead of storing a unique device identifier directly it may be determined from the stored enrollment PUF string. For example, a unique device identifier may be derived by hashing the enrollment PUF string, and using all or part of the result hash as the unique device identifier. This reduces storage requirements. It also allows the use of a database that stores enrollment strings, but currently does not store device identifier for assigning device identifiers, without having to change the database.

Accept unit 351 may also, or instead, send instructions to the PUF device, e.g., computer instructions, e.g., to configure sensors, or to configure an actuator or the like. Accept unit 351 may also, or instead, store information received from the matching PUF device, e.g., together with the PUF string, and store it in association with a unique device identifier. In this case, it is not even necessary to return the device identifier to the PUF device, or in fact, to return any information to the PUF device. For example, in an embodiment, a PUF device is configured as a sensor device and periodically sends sensor information to identification device 330 together with a PUF string. Identification device 330 uses the PUF string to identify the PUF device and stores the sensor information in association with other sensor information that have been, or will be, received from that PUF device, e.g., in association with a unique device identifier.

Even if no matching PUF enrollment string is found, an acceptance action may still be performed, e.g., together with adding the received PUF string to the database.

An acceptance action may be to log information regarding the PUF device, for example. The information may be that a particular PUF device has been identified, or seen, e.g., at a particular location. The information may be stored together with a fixed identifier. This application does not need any further communication to/from the PUF device itself. This is acceptance action may be used in tracking applications. In this example, the acceptance action may be performed in case no match if found.

If comparison unit 350 does not find a match between the received PUF string 341 and the retrieved enrollment PUF string 362, using the matching threshold 363, then search unit 360 retrieves a next retrieved enrollment PUF string 362 and has the next retrieved enrollment PUF string 362 compared to received PUF string 341. In an embodiment, search unit 360 continues to retrieve a next PUF string and have it compared to the (same) received PUF string 341 until either a match if found or until the set of enrollment PUF strings is exhausted, e.g., when all enrollment strings have been tried. In an embodiment, the matching threshold that is used depends on the comparison, e.g., on the PUF strings being compared, in particular on the enrollment string 363 that is compared. Using non-constant Hamming distance thresholds contributes to solving problems posed by non-uniform characteristics in the PUF population. There are various ways in which the particular matching threshold can be obtained, and these are discussed herein.

In an embodiment, search unit 360 aborts searching once a matching enrollment PUF string has been found. For example, a so-called 'break' instruction can be executed upon finding a matching enrollment PUF string. This is particularly advantageous if the matching thresholds have been arranged so that at most one match is to be expected with non-negligible probability. What a negligible probability is, depends on the particular application; As an example, one could take, say, 2^(−80) as a negligible probability. On the other hand, in a different embodiment, the search unit may continue searching after finding a match. This has the advantage that situations in which incorrect matches may be made are brought to light quickly. In an embodiment, a full search is not done on most searches but is periodically executed to verify correct working of the PUF identification system. In a system in which most received PUF strings match an enrollment PUF string, full searching about doubles the search time on average, which can be significant for some applications. In a system in which most matches are not matches, full searching upon a match does not greatly increase search time. For example, in an embodiment, a PUF device may be configured to receive a unique device identifier from the identification device 330, store the received unique device identifier in a memory, in particular in a non-volatile memory, and cease the sending of a PUF string to the identification device so long it has a device identifier stored in the memory. In such a system, full searching can be more easily justified given the costs.

If searching unit 360 does not find a matching enrollment PUF string, a non-acceptance action may be performed. A non-acceptance action may, e.g., be to report that no matching string was found. This may be reported to the requesting PUF device. This may also or instead be reported to another party, e.g., an operator of identification device. For example, in an anti-counterfeiting application the default behavior may be to report matching or non-matching, as the case may be, to an operator of the device.

However, a particularly useful non-acceptance action may be to enroll the PUF device. For example, in an application for providing a unique device identifier to PUF devices, this is a good choice. For example, identification device 330 may comprise an enrollment unit 352. Enrollment unit 352 may be triggered by search unit 360 if no match is found. Enrollment unit 352 may also be triggered by other elements. For example, during manufacture enrollment PUF strings may be registered, without necessarily going through search (although that is a valid option, as then matching PUF devices could be rejected).

For example, to enroll a PUF device an enrollment PUF string may be stored in database 312. For example, the received PUF string 341 may be used as the enrollment PUF string. For example, additional information, if such is used in a particular embodiment, may also be stored together or in association with the enrollment PUF string. An important application is for the enrollment unit 352 to generate a unique device identifier, e.g., a random string, a counter, or the like, and to store the unique device identifier with the enrollment PUF string. The unique device identifier may be returned to the PUF device that provided the PUF string 341. Indeed, for the PUF device it may be fully transparent whether its PUF string matched or not, as in both cases a unique device identifier is received. Enrollment unit 352 may be configured for adding the received PUF string to the database in case no matching enrollment PUF string is found.

An enrollment unit is not necessarily included in identification device 330. For example, if searching fails, then identification device 330 may report such. For example, in an embodiment a PUF device can only enroll in enrollment devices, e.g., that have write-access to database 312. In an anti-counterfeiting application, a received PUF string that does not match in the matching phase, is typically not enrolled into the system.

The matching threshold 363 that is used for a comparison with a PUF string 362 and which is part of the input 361 to the comparison unit that is provided from the search unit can be obtained in various ways.

A preferred way to obtain the matching threshold is to derive it from the PUF string that are compared themselves. From even a single PUF string characteristics of the PUF can be derived which in turn allows estimation of a proper matching threshold. In principle, the matching threshold could be derived from the received PUF string as well as from the enrollment PUF string, or even from both. However, allowing the received PUF string to indirectly set the matching threshold used in the comparison is not preferred from a security point of view.

Figure 3B:
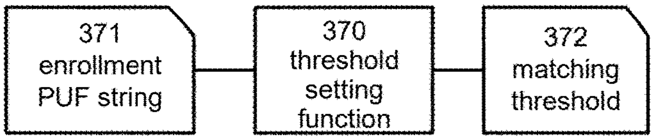

FIG. 3*b* schematically shows an example of an embodiment of a threshold setting function 370. Function 370 takes as input a PUF string, typically an enrollment PUF string, and produces as output a matching threshold 372, e.g., as could be used in comparison 350. Function 370 could be part of identification device 330, although this is not necessary. Function 370 is preferably applied on an enrollment PUF string, but could instead or in addition be applied to any PUF string.

Function 370 could be called during enrollment; in which case the matching threshold could be stored in database 312. Storing the matching threshold obviates the need of recomputing it each time a comparison against that enrollment PUF string is made. On the other hand it does require altering the format of the database, which may be undesirable. Function 370 could also be called during searching, e.g., before a comparison. Function 370 could also be called during searching, e.g., after retrieving the enrollment string but before the comparison. Function 370 could also be called after a Hamming distance is computed, to verify if the Hamming distance is low enough. Function 370 could be called, for promising enrollment PUF strings only, e.g., enrollment PUF strings that have a low Hamming distance to received PUF string 341, which may or may not be enough for a match.

For example, in an embodiment that search unit 360 may be configured to repeatedly retrieve an enrollment PUF string from the database. The matching threshold may then be determined from the retrieved enrollment PUF string by calling function 370. Alternatively, the matching threshold may be retrieved from database 312. The matching threshold may be stored in database 312, associated with the enrollment PUF string. Storing thresholds in the database allows more complicated, e.g., time consuming, threshold setting functions. Moreover, a stored threshold may be modified upwards or downward in case of false rejection and/or acceptance, respectively.

The matching threshold may thus be retrieved from database 312 together with the enrollment PUF string, and this avoids recomputation of function 370. However, this may imply that database 312 has to be modified and this is an important drawback of this option. PUF based identification is particularly useful for existing system, e.g., already deployed PUF devices, with an unknown mix of multiple PUF characteristics. Even database 312 may be an existing database, using enrollment PUF strings for identification; however, the identification system may not yet be enhanced to use multiple matching thresholds. In such a situation, altering the existing database is not desirable.

Using a function 370 to compute the matching threshold is a preferred way of obtaining a matching threshold but not the only one. For example, in an embodiment of a PUF identification system, PUF devices have a type identifier. For example, the type identifier may be a chip batch, a chip ID, a manufacturing date, or the like. A matching threshold may be determined from the PUF type identifier. For example, in a lookup table, the PUF type may be associated with a matching threshold. The matching thresholds may be determined empirically, e.g., increased if there are too many false rejections and decreased if there is too much false acceptance. The matching threshold could be initialized using a default matching threshold, and modified in practice based on observed results for a particular PUF type. The two methods could be combined, for example, the default matching threshold could be set using function 370, and modified based on PUF type. Typically, however PUF type is not known, or at best, can only be inferred from a PUF string, so that using a function 370 is preferred.

In an embodiment, the PUF device may be configured to determine a fixed identifier for the external PUF device. There are several ways to go about this. For example, the fixed identifier may be stored in the database in association with the matching enrollment PUF string. If the matching enrollment PUF string is found, the fixed identifier retrieved from the database may be used. Another way is to apply an identifier generating function to the matching enrollment PUF string. This avoids having to store the fixed identifier. For example, if a matching enrollment PUF string is found, the function may be applied to all or part, of the matching enrollment PUF string, and the fixed identifier may comprise at least part of the function output. A good example of such a function is a hash function. If a matching enrollment PUF string is not found, the received PUF string may be added if desired. A fixed identifier may be generated, e.g., randomly chosen, and stored in the database in association with the received PUF string. Storing the fixed identifier is not needed if an identifier generating function is used.

The determined fixed identifier may be sent to the external PUF device, but this is not needed. For example, in a tracking application, the fixed identifier may be used for logging information related to the PUF device in the database associated with the fixed identifier.

Figure 3C:
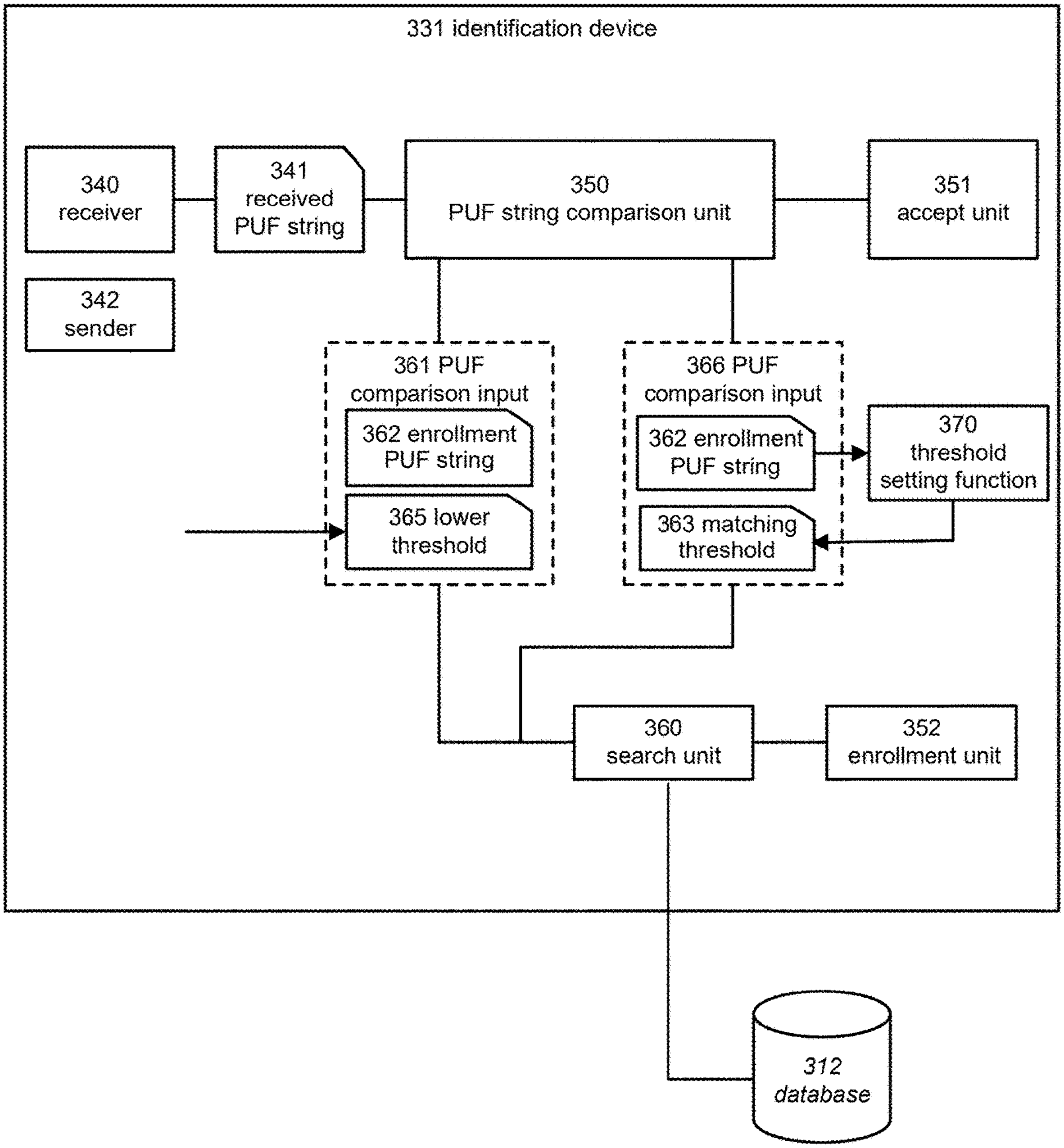

FIG. 3*c* schematically shows an example of an embodiment of an identification device 331. Identification device is similar to device 330 except that function 370 is only employed on promising enrollment strings.

As in identification device 330, search unit 360 iteratively retrieves enrollment strings from database 312. It is assumed in this embodiment that database 312 does not store the matching threshold corresponding to a particular enrollment PUF string. Given a retrieved enrollment string 362, it is first compared to received PUF string 341 using a fixed matching threshold 365. Matching threshold 365 is constant, e.g., the same for all enrollment PUF strings and all received PUF strings. For example, threshold 365 may be chosen as the maximum matching threshold that will be produced by function 370, or the maximum matching threshold that will be produced for an enrollment string in database 312. Threshold 365 may also be estimated, say empirically, or based on a sample, or experience. Preferably such an estimated threshold is on the high side. Constant threshold 365 is also referred to as the upper threshold, as preferably all specific thresholds are less or equal to the constant threshold 365.

Initially comparison is done with as input the retrieved enrollment PUF string 362 and the constant matching threshold 365. If the comparison is negative, that is, if the Hamming distance between PUF strings 341 and 362 is higher or equal to the constant matching threshold, then the match is rejected; if there are untested enrollment strings left, the search can be continued with the next enrollment PUF string. If there are no untested enrollment strings left, then a non-accept action may be performed, e.g., enrolling received string 341.

If a match is found, that is, if the Hamming distance between PUF strings 341 and 361 is lower than the constant matching threshold 365 then a specific matching threshold 363 is computed. For example, specific threshold 363 may be computed by applying the threshold setting function 370 on the enrollment PUF string 362. It may happen that the specific threshold equals the constant threshold, and in that case the received matching string 341 is accepted. The acceptance action may be performed, e.g., action 351. It may happen that the specific threshold is lower than the constant threshold, in that case the received matching string 341 is accepted if the Hamming distance is also below the new threshold. For example, the following pseudo-code may be used.

```
hd:=hamming_distance (Puf_String_341, Puf_String_362)
threshold := constant_threshold_365
if (hd < threshold) then
  threshold := threshold_setting_function_370 (Puf_String_362)
if (hd < threshold) then match_is_found else match_is_not_found
```

The second comparison using the second input set 366 is only executed for part of the database 312, so that the impact of function 370 is small, even if the matching threshold are not stored in database 312. In this way storage in database 312 is spared and reorganizing the database is avoided, without an important increase of the overhead. Note that the match_is_not_found in the last line of the pseudocode above refers to the specific match between Puf_String_341 and Puf_String_362; a further match with a different retrieved enrollment PUF string is still possible.

The above embodiment may be simplified, by using a function 370 that only gives a limited number of possible thresholds; In particular, if the function gives only two possible thresholds: a lower threshold and an upper threshold. In that case function 370 could be simplified to a Boolean function that indicates that increased scrutiny is needed, that is, the lower threshold needs to be used. Using only two thresholds significantly simplifies the analysis of the false acceptance and false rejection rates, and thus contributes to the code security and robustness.

As shown, in the above pseudo-code the threshold setting function 370 only depends on the enrollment PUF string 362. This has several advantages. For example: the database does not need amending to adopt a multiple threshold embodiment; an attacker may have control over the received PUF string 341, but less likely has control over enrollment PUF string 362. Other embodiments for function 370 are possible. For example, any of the following are also possible embodiments for threshold setting function 370. These could also be employed in the embodiments discussed with reference to FIG. 3*a* and/or 3*b*.

| | |
|---|---|
| 1. | threshold_setting_function_370 (Puf_String_341) |
| 2. | threshold_setting_function_370 (Puf_String_341, Puf_String_362) |
| 3. | threshold_setting_function_370 (Puf_type) |
| 4. | threshold_setting_function_370 (Puf_String_362, Puf_type) |

For example, instead of the enrollment string 362 one could take the received PUF string 341. This will work correctly provided PUF string 341 has not been tampered with. It depends on the application if tampering is likely or if attacks are damaging enough to worry about. Other security measures could be used to counter such a threat, e.g., requiring a signature of the PUF device over the received PUF string. One could also use the enrollment string 362 as well as the received PUF string 341. This has the advantage of increasing precision in estimating the thresholds but with the same disadvantage of having less control over the received PUF string. The threshold setting function may depend on the PUF type, if known. In important applications, the PUF type is not known, and so this option would not be available. However, a PUF device may supply with its PUF string an indication of its hardware, e.g., the type of memory chips, the batch number, a manufacturing date. Such information may be used to set or modify thresholds. For example, in an embodiment, a selection of PUF devices of a particular type is empirically tested to set appropriate thresholds. These thresholds may be stored in a look up table. In an embodiment, PUF type is used as additional information. For example, thresholds may be derived from the enrollment PUF string 362, but may be modified up or downwards based on type. For example, if a particular PUF type has high false acceptance rate, e.g., as evinced by logfiles, the acceptance threshold may be decreased; or if a PUF type as high false rejection rates, the acceptance threshold may be increased.

Determining a fixed identifier for an external device using PUF string determined by the external device can be used in various application, as set out herein. As one example, a tracking method for logging tracking information for an external PUF device may comprise,

- receiving the PUF string, the PUF string having been obtained by measuring an external PUF device,
- searching for a matching enrollment PUF string in the database, the database comprising multiple previously obtained enrollment PUF strings of multiple external PUF devices, the searching comprising iteratively determining if a Hamming distance between the received PUF string and an enrollment PUF string retrieved from the database is below an upper threshold, and if so, and determining a specific threshold depending on the specific retrieved enrollment PUF string, the enrollment PUF string matching if the Hamming distance between the received PUF string and retrieved enrollment PUF string is below the specific threshold, and
- if a matching enrollment PUF string is not found, determining a fixed identifier and storing the received PUF string,
- if a matching enrollment PUF string is found, determining the fixed identifier for the matching enrollment PUF string,
- logging information in association with the fixed identifier.

Below are a number of exemplifying embodiments are discussed, that provide various alternatives. They can be combined with functions 370 such as discussed herein.

In all examples a database is used having entries that comprise an enrollment PUF and a device ID. Instead or in addition of a device ID any other information for the corresponding PUF device may be stored. Furthermore, a received PUF string is compared to enrollment PUF strings until a match is found or until all enrollment PUF strings have been tried without finding a match.

Example 1: The database entries also store a matching threshold for the enrollment PUF string. The matching threshold is precomputed, e.g., by applying function 370 to the enrollment PUF string. The matching uses the matching threshold in the database entry for the enrollment string.

Example 2: The database entries do not store a matching threshold for the enrollment PUF string. Function 370 is called for each retrieved enrollment PUF string.

Example 3: The database entries do not store a matching threshold for the enrollment PUF string. Function 370 is called for the received PUF string 341. This has the advantage that computation overhead is low, as function 370 needs calling only once. This option allows an attack to influence the matching threshold by manipulating the PUF string 341. In applications where adverse actions are anticipated, this example is less preferred. Moreover, as the matching threshold is computed from a variable received PUF string, the matching threshold may differ from amongst PUF strings, e.g., from day to day, thus potentially decreasing the robustness; some PUFs may be accepted one day, rejected the next.

Example 4: To match, the Hamming distance between received PUF string and enrollment PUF should be less than a fixed upper matching threshold, which is the same for all enrollment PUF strings; If a match is found repeat the matching for the correct matching threshold if needed. The correct matching threshold may be computed with function 370.

Example 5: As in example 4, but wherein the correct matching threshold is either the fixed upper threshold, or a fixed lower matching threshold—with no other options than these two.

FIGS. 4*a*-4*e* schematically show examples of an embodiment of a database, in particular of database entries, or records.

Figure 4A:
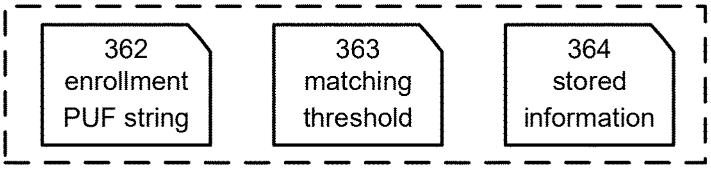

According to the example in FIG. 4*a*, a database entry comprises an enrollment PUF string 362, a matching threshold 363 and stored information 364. The stored information 364 may be information for provisioning to the PUF device that matches with enrollment PUF string 362. In particular, stored information 364 comprises a unique device identifier for use by the PUF device or by an external system interacting with the PUF device.

Figure 4B:
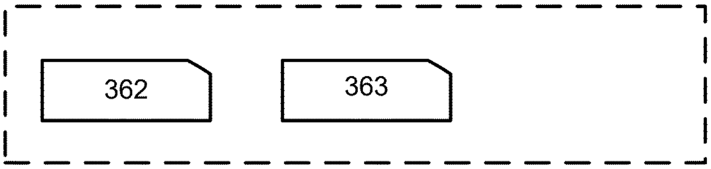

According to the example in FIG. 4*b*, a database entry comprises an enrollment PUF string 362, and a matching threshold 363 but not stored information 364. For example, this may be used, in an embodiment in which information coming from the PUF device is to be stored, but no fixed ID is needed to be sent back. Not shown, but in the entry received information may be stored. For example, this may be used in an anti-counterfeiting embodiment.

Figure 4C:

According to the example in FIG. 4*c*, a database entry comprises an enrollment PUF string 362, and stored information 364 such as an ID, but not a matching threshold. The matching threshold can be computed when needed.

Figure 4D:
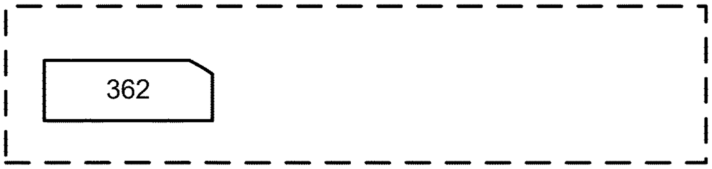

According to the example in FIG. 4*d*, a database entry comprises an enrollment PUF string 362, but neither stored information 364 nor a matching threshold. The matching threshold can be computed when needed. In this case, no device identifier is explicitly stored. This format may be used, if the PUF device does not need a device identifier, and identification from the received PUF string is enough. Even though no device identifier is stored, device identifier could be derived from the stored enrollment PUF string if needed. For example, a function for deriving an identifier could be applied to the enrollment PUF string. For example, said function may be a so-called key derivation function (KDF), a hash function, or the like.

Figure 4E:
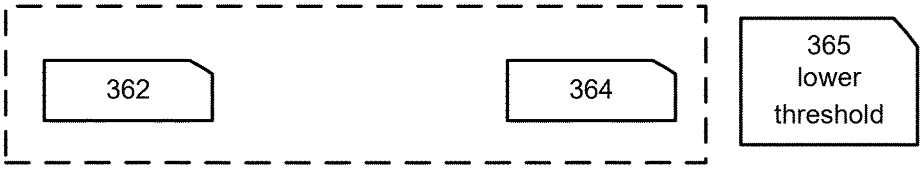

According to the example in FIG. 4*e*, a database entry comprises an enrollment PUF string 362, stored information 364 such as an ID, but no matching threshold 363. In an initial matching a constant matching threshold 365 is used. If a match is found for constant matching threshold 365, then a further matching is done with a specific matching threshold.

The specific matching threshold can be computed when needed.

If the number of thresholds that are used are small, and specifically if the number of thresholds used is two, then the threshold information 363 may be stored with few bits; for two levels a single bit indicating if the high or low threshold such be used. For example, in FIG. 1, a single bit of information is sufficient to distinguish between threshold T1 and T2.

It was an insight of the inventors that a propensity of PUF bits towards 1-bits or away from 1-bits, influence the threshold. For any particular bit in a binary PUF string one could define its 1-probability, also referred to as p1, as the probability that the bit will be measured as 1 in a new independent measurement, e.g., after a reboot of the PUF. The 1-probability for any particular bit is likely quite different across different PUF devices, and will also vary from bit to bit even in the same PUF. Even if these two PUF devices are of identical type, and corresponding bits are compared, then the 1-probability is likely not the same. 1-probability of a bit is a local effect per device. Measuring the 1-probability for a particular bit on a particular device is often impractical as it may require repeated measurements. However, the average 1-probability can be estimated even from a single PUF response, by dividing the number of 1s in a PUF string by the number of bits.

The 1-probability is in the literature sometimes referred to as bias. To avoid confusion, when using bias in this document in the meaning of 1-probability, we will refer to the uncorrected bias. Related to the 1-probability is PUF Noise also referred to as pe or bit error probability. The PUF noise for any particular bit, is the probability that the bit is different in two independent measurements of that bit on that PUF device. Like the one probability, estimating it for a particular bit is impractical.

It was an insight of the inventor that a more relevant variable for a PUF bit than its one-probability per se, is how much the 1-probability deviates from ½. Accordingly, the corrected bias is introduced, or p1c. The corrected bias for a particular bit is the minimum of p1 and 1−p1 for a particular bit. Directly estimating the corrected bias for a particular bit from repeated measurements is impractical just as for the uncorrected bias. Like the uncorrected bias, also the corrected bias may be averaged over an entire PUF string of a particular device, or averaged over part of the PUF string of a particular device. We will also refer to the deviance of a bit, that is the absolute value of ½−p1, that is ½−p1c. Deviance equals ½ minus the corrected bias. Deviancy is typically referred to as average deviancy.

It is an insight of the inventors to select a matching threshold in dependence on the average corrected bias, or average deviance. In particular, the matching threshold may be higher if the average deviance is low, or average corrected bias is near ½, while the matching threshold may be lower if the average deviance is high, or average corrected bias is not near ½. For example, in an embodiment the matching threshold is derived from a measure for the deviance, e.g., from a variable that is correlated with the deviance. For example, in an embodiment, a measure for the deviance is computed from a PUF string, the matching threshold being derived from the measure such that the matching threshold decreases with an increasing deviance measure. The decrease of the matching threshold need not be strict, and may be constant over a range of the deviance. In other words, if, say, from the enrollment PUF string it is derived that deviancy is low, then a higher Hamming distance is accepted to match a received PUF string. On the other hand if it is derived that deviancy is high, then a lower Hamming distance is accepted to match a received PUF string.

For example, in an embodiment, the dependent threshold determined for a PUF string of the PUF device depends on a measure for the average deviance determined from the PUF string. For example, in an embodiment, a measure for the average deviance is computed from the enrollment string, the matching threshold is determined from the measure.

One way to estimate the average corrected bias from a single PUF string is by taking advantage of the following observation. The inventors found that in a typical PUF string, especially in a volatile memory based PUF string such as an SRAM PUF, the 1-probability runs in blocks of length M bits. The 1-probability appears to be alternatingly higher and lower than ½ in subsequent blocks. For example, if in a first block of M bits, the 1-probability is higher than ½, then in the next block of M bits, the 1-probability may be lower than ½. The next blocks continue this pattern, with the next block having a 1-probability which is higher than ½, then lower than ½ and so on. The value of M is typically a power of 2, e.g., 1, 2, 4, 8, etc.; this is not necessary. M could be larger as well, e.g., at least 128 bits, at least 2048 bits, etc. M is typically expressed in bits. The block size is related to manufacturing details of the physical device, including such things as the memory layout, or how the address decoder maps logical addresses into the physical areas of the SRAM.

It turns out that a typical volatile memory PUF satisfies an even stronger property, namely that 1-probability across even-numbered blocks is about equal, and 1-probability across odd-numbered blocks is about equal; moreover, one of the two 1-profanities is typically below ½ while the other is above ½. In fact, a typical volatile memory PUF satisfies an even stronger property, that the 1-probability for even-numbered blocks and for odd-numbered blocks seem to sum to 1. Note that determining M would still work for a PUF in which, for some, reason, 1-probability is less well behaved as long as 1-probability varies in blocks, as seems to be the case in experiments.

The particular value of M depends on the PUF that is being examined. It can be estimated though, even, from a single PUF measurement in various manners. For example, M can be estimated from a Fourier transform of the autocorrelation. For example, M may be taken as the half of the smallest non-zero local maximum of autocorrelation over the PUF response bits. Typically, the autocorrelation shows its first maximum at the period of the repeating bias pattern. But as one period contains two bias blocks, one high and one low, and M is the block size, it will be half of the first maximum. Once an estimate of M is known, the average corrected bias can be estimated by inverting alternate blocks and finally computing the 1-probability over the partially inverted PUF string.

Note that this procedure could be carried out online. Although precision may be increased when having multiple PUF string measured from the same PUF, this is not necessary. This procedure may be performed on a single PUF string. The resulting deviance estimate may then be translated to a matching threshold. To obtain a matching threshold from a deviance measure one could use a lookup table. The lookup table may be prepared empirically or may use threshold computed mathematically. Alternatively, the threshold may be computed by applying a threshold setting function to the measure.

For example, an embodiment of an identification method for matching a received PUF string against a database may comprise determining a block length M for a PUF string, e.g., an enrollment PUF string, for example, using a discrete Fourier transformation or autocorrelation, estimate the deviance by inverting alternate blocks of length M in the PUF string, and counting the number of 1-bits, determine a matching threshold from the number of 1-bits, e.g., by applying a lookup-table. The determined matching threshold may be used to compare the received PUF string with the enrollment PUF string.

Although the above embodiment addresses the problem mentioned herein, in particular the problem of having an unknown mix of PUF characteristics such as deviancy in a PUF population, it can be improved upon.

The inventors found that average deviancy is related to the equal pair probability. When a PUF string is portioned into a string of successive pairs of bits, e.g., the PUF string $a_0a_1a_2 \ldots$ may be partitioned into $(a_0, a_1)$ $(a_2, a_3) \ldots$, then the equal pair probability is the probability that the two bits in a pair are equal. For example, the equal pair probability may be taken as the probability that $a_2$; equals $a_{2i+1}$. The equal pair probability can be estimated from a single PUF string by partitioning the string in pairs and counting the number of pairs that have equal bits. The equal pair probability can be taken as a measure of the deviancy. Accordingly, in an embodiment the equal pair probability may be estimated from an enrollment PUF string which in turn may be used to determine the matching threshold, e.g., using a function or a lookup table.

If the deviancy is 0, then the equal pair probability is ½. If the deviancy increases then the equal pair probability will be increasingly removed from ½. If M>1 then the equal pair probability increases with increased deviancy. If M=1, then the equal pair probability decreases with increased deviancy. Accordingly, the absolute value of the difference between ½ and the equal pair probability, or the equal pair deviancy, may in both cases be taken as a measure of deviancy. In other words, if we refer to the distance from ½ for the equal pair probability as its deviance, it seems that equal pair deviancy increases with deviancy. In an embodiment, the equal pair deviancy may be estimated and used, e.g., in a lookup table, to determine a matching threshold. In practical terms such an embodiment would not differ much from a one that takes the equal pair probability directly as input through.

For example, in an embodiment of an identification method, the number of equal pairs in the enrollment string is counted, e.g., in a partitioning into successive pairs, and the matching threshold for comparing with said enrollment string is determined therefrom. For example, in an embodiment, two or more thresholds are associated with two or more ranges of the measure of deviance. For example, two or more thresholds may be associated with two or more ranges of the equal pair probability.

Note that whenever the equal pair probability is used, the unequal pair probability can be substituted with minimal adaptations, as the equal pair probability and unequal pair probability sum to 1.

Accordingly, there are various measures for the average deviance that can be determined from a PUF string, in particular from the enrollment PUF string. For example, the measure may be computed from a PUF string by first estimating the block size M, and using the estimated block size to directly estimate the deviancy. For example, the number of equal (or unequal) pairs in the enrollment PUF string may be counted which may also be taken as a measure of deviancy. In either case, the matching threshold may be determined from the measure, e.g., through a lookup table in the identification device. Note that function 370 may be implemented in either way. Using equal pair probability has the advantage that block size does not need to be estimated and is therefore faster.

Below further non-limiting examples are given. It was an insight of the inventor that for typical PUF responses, especially volatile memory based such as SRAM, there is a relation between the observed noise between PUF measurements and the amount of corrected bias observed in those measurements; PUF responses with a higher deviancy (p1 deviating further from the ideal 50%), tend to be less noisy (lower pe).

Figure 5:
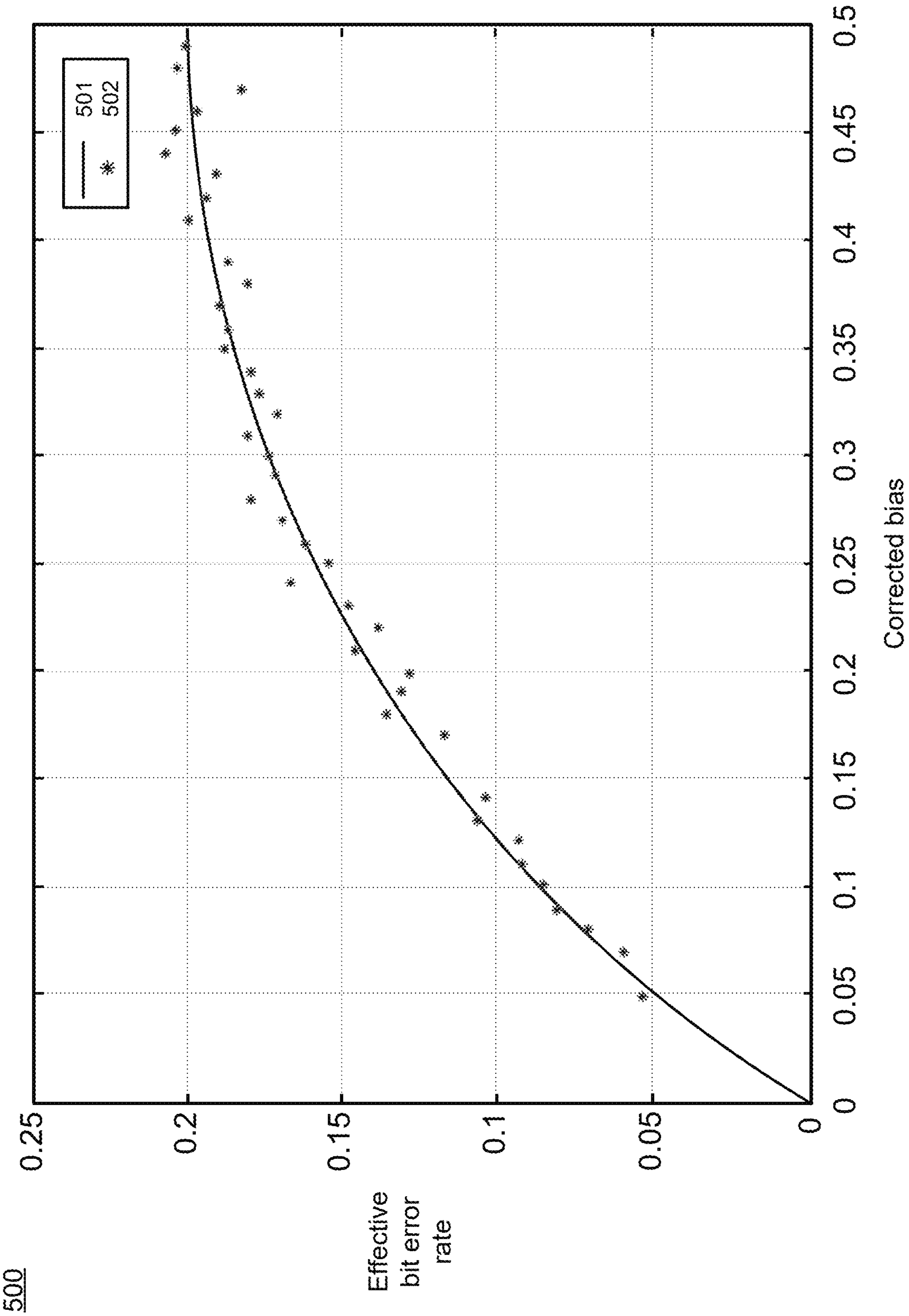

As an example, this relation is depicted in the FIG. 5. FIG. 5 schematically shows an example of an effective bit error rate (BER). The x-axis of FIG. 5 shows the corrected bias. The y-axis shows the effective bit error rate. The figure shows the result of simulations 502, and a curve 501 fitted to these points. FIG. 5 shows simulated data points 502 of effective bit error versus Pbias, and a trendline 501 showing relationship between effective bit error and Pbias.

The curves are generated from simulated PUF responses. The Bit Error Rate (BER) indicates the noise in the case of no bias (Pbias=p1=0.5). This curve indicates that, all other things being equal, a PUF response which would experience e.g., pe=20% bit errors when unbiased (p1=50%), experiences gradually smaller bit error rates when it would be biased, e.g., pe=17.3% when p1=30%. This curve shows that one could first determine the deviancy based on the observed enrollment bit string. Then a better matching threshold may be chosen which depends on the observed deviancy.

As explained above, in the case of SRAM PUF, bias in the SRAM startup values typically occurs in patterns. For example, the first M bits of a PUF response may be biased more towards one (e.g., p1=0.7), the next M bits are biased with the same amount in the opposite direction i.e. towards 0 with one-probability 1−p1=0.3, the next M bits towards 1, and so on. Again, the one-probability is denoted as p1 here and has a specific value for every device.

The size of the pattern M can differ per type of SRAM memory. The pattern size M can for example be M=1, M=2, M=8, . . . , M=128 or any other value (typically a power of 2) and is caused by the physical layout of the SRAM memory. In principle, a PUF device could report on its chip architecture from which the M value could be determined, e.g., using a lookup table. In practice, this information is often not accessible, not even on the PUF device itself. M can be equal to the size of the memory N; in that case all bits are biased towards the same value p1.

Figure 6A:
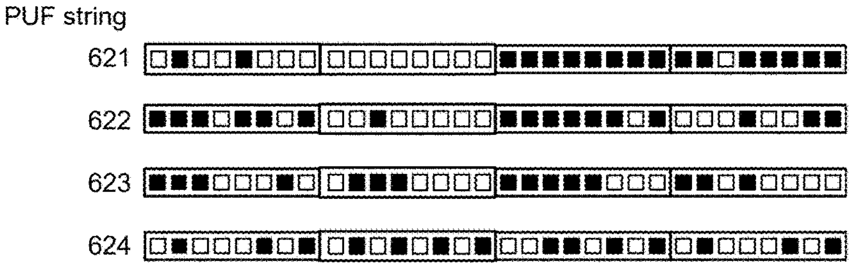
Figure 6B:
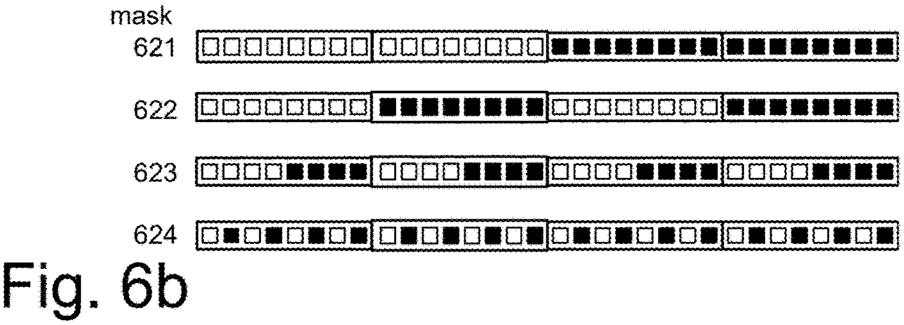

FIG. 6*a* schematically shows an example of an embodiment of biased PUF response patterns. In FIG. 6*a*, black dots represent bit values 0 and white dots represent bit values 1. Pattern 611 has M=16. Pattern 612 has M=8. Pattern 613 has M=4. Pattern 614 has M=1. In practice a PUF response will be a longer than the 32 bits shown in FIG. 6*a*. For example, a PUF string may be at least 128, 256, 1024, or 2048 bits long. Deviancy can be computed directly from a pattern such as in FIG. 6*a* by XOR-ing the pattern with an alternating block pattern with the same bit size M. FIG. 6*b* schematically shows an example of an embodiment of such bias mask patterns. Pattern 621 has M=16. Pattern 622 has M=8. Pattern 623 has M=4. Pattern 624 has M=1. XORing a pattern of FIG. 6*a* with the corresponding pattern of FIG. 6*b* produces a corrected PUF string, from which the average corrected bias can be directly estimated, e.g., as the 1-probability of the corrected bit-string. For example, patterns 612 and 622 may be XOR-od. The 1-probability may have to be corrected by computing one minus the observed 1-probability, to obtain the average corrected bias. Likewise, the deviancy can also be obtained from the corrected bit string directly or from the average correct bias.

For example, in an embodiment the M value for a PUF device is obtained, e.g., from database 312, e.g., by analyzing the enrollment PUF string, or by querying the PUF device, e.g., during enrollment. The block size may be used to determine deviancy which may then be used to determine a matching threshold.

To determine M one can compute the autocorrelation of the PUF response. In case there is a certain bias pattern, the autocorrelation will show periodic components. A frequency analysis or FFT can then be used to detect what is the main frequency of the periodic variation. The period=1/frequency equals two times the pattern size M. Having computed M, the deviancy can then be computed by XORing the PUF response with a mask pattern (M bits 1, M bits 0, and so on) and then computing the Hamming Weight.

A possible embodiment is to compute the block size M for an enrollment PUF string and to assign the PUF to a PUF type based upon the computed block size. The PUF type or M-value may then be used to set the matching threshold. This works for example, if the different PUF types are so different that they have a different M size, in which case using different matching thresholds is likely to significantly improve the matching quality. Note however, that typically the bias is independent of the block size M; For a specific set of similar devices the block length M is normally the same, but the amount of deviancy can quite different per device.

Nevertheless, computing the block size, especially if this is done for every retrieved enrollment string significantly adds to the computation time, and is preferably avoided. Moreover, different matching thresholds are also desirable if the different PUF type have the same block size, even if other PUF characteristics differ. Accordingly, it is desired to compute suitable matching thresholds without explicitly computing the block size.

Fortunately, it is possible to avoid estimating the block size altogether by counting the occurrence of specific binary value combinations in consecutive non-overlapping bit pairs, the amount of bias can be assessed by an algorithm, e.g., in the matcher. Denote with C00, the number of 00 pairs, with C01 the number of 01 pairs, with C10 the number of 10 pairs and with C11 the number of 11 pairs. For a PUF response of length N bits (i.e., N/2 non-overlapping bit pairs), the probability PXY of occurrence of a certain pair XY can be estimated as PXY=CXY/(N/2), where XY is any combination of 00, 01, 10 or 11.

In case there is no bias, the expected count of all the possible pairs will be equal: P00~0.25, P01~0.25, P10~0.25, P11~0.25. Here probability of occurrence of a bit pair PXY is computed by the count value CXY divided by the total number of pairs (i.e. the size of the memory N in bits divided by 2).

In case of bias one will typically see values P00>0.25, P01<0.25, P10<0.25 and P11>0.25. The more bias, the bigger the difference from 0.25. The above holds for all cases 1<M<N. For the other cases:

M=1 (also called odd/even bias). In this case every other bit has an opposite bias. It will be either P01 and P10 that will be larger than 0.25, and both P00 and P11 will be <0.25.

M=N (also called global bias). In this case it will be either POO or P11 that have a value >0.25

The amount of bias can be assessed by observing the “equal pair ratio” EPR=P00+P11. For a given value of bias expressed in one-probability p1, the equal pair ratio for M>1 can be computed as: EPR=P00+P11=(1−p1)^2+p1^2. In case there is odd/even bias (M==1), the expected equal pair ratio is equal to EPR=1−((1−p1) ^2+p1^2)=2*(1−p1)*p1.

Figure 7:
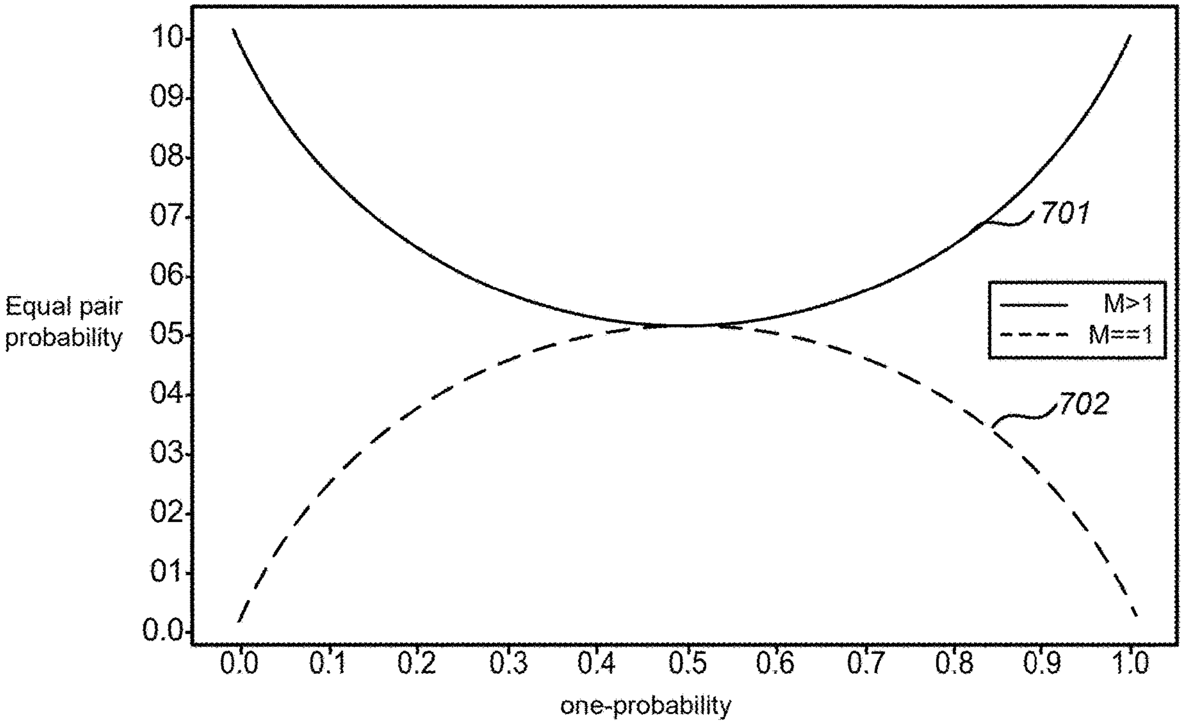

FIG. 7 schematically shows an example of equal pair ratio as function of one-probability. Curve 702 is for the case M=1. Curve 701 is for the case M>1. The x-axis is the one-probability. The y-axis the equal pair probability, or equal pair ratio. Using the figure, or mathematically, one can for example derive that a bias of 0.25<p1<0.75 corresponds to an equal pair ratio 0.37<EPR<0.63.

Using the equal pair ratio is preferable to first estimating M. The former has a higher complexity of computation and is more time-consuming. Moreover, frequency analysis and thus the correct determination of a mask pattern, only works if there is enough bias for proper detection of the periodic components.

For example, in an embodiment, the amount of bias is determined by computing the number of equal pairs C00+C11. The matching threshold is then computed as a function of C00+C11, or T=f (C00+C11). The function f( ) can be implemented in the form of a lookup-table. In an embodiment, a set of discrete matching thresholds are defined. Depending on an assessment of the bias, e.g., of the number of equal pairs C00+C11, a specific matching threshold is selected.

For example, in an embodiment, 2 threshold levels are used. The higher threshold value T1 is selected when the bias is such that 0.25<=p1<=0.75. The lower threshold value T2 is selected when bias is such that p1<0.25 or p1>0.75. The criterium is validated by counting the number of equal pairs C00+C11.

| Criterium | Bias estimate | Threshold | |
|---|---|---|---|
| 0.37*N ≤ C00 + C11 ≤ 0.63*N | 0.25 ≤ p1 ≤ 0.75 | T1 | Low bias case |
| C00 + C11 < 0.37*N or C00 + C11 > 0.63*N | p1 < 0.25 or p1 > 0.75 | T2 | High bias case |

Information related to the bias and/or the determined matching threshold may be stored in a database, e.g., together with a unique device identifier. This has the advantage that the determining of the bias does not need to be done every match, but only once at enrollment in the database. For example, at every database item a value can be stored that indicates which threshold to use when matching. In case we use only 2 matching threshold values, this information can be stored with 1 bit of information per database item. When determining an ID for an incoming PUF response, the matcher is used to compare the incoming PUF response with every PUF response in the database and thereby uses the matching threshold indicated in the database. As an example, one could take T1=32%, T2=21%, e.g., when N=256 Bytes=2048 bits, T1=655 bits, T2=430 bits. This thresholds may be determined both empirically and mathematically given the characteristics of the device.

In an embodiment, the matching always uses the high threshold T1 initially to match incoming PUF strings with database enrollment PUF strings. Only when a match is found ($HD<T1$), is the bias assessed by counting the bit pairs and computing C00+C11 for the enrollment PUF string. For example, this may be done as follows, e.g., when there are 2 threshold levels:

- If the bias is high (e.g., $C00+C11<0.37*N$ or $C00+C11>0.63*N$), match again with the lower threshold T2.
  - If this still results in a match ($HD<T2$), the match is accepted (output of matcher: True).
  - If this does not result in a match ($HD\geq T2$), the match is rejected (output of matcher: False).
- If the bias is low (e.g., $0.37*N\leq C00+C11\leq 0.63*N$), the match is accepted (output of matcher: True).

Figure 8A:
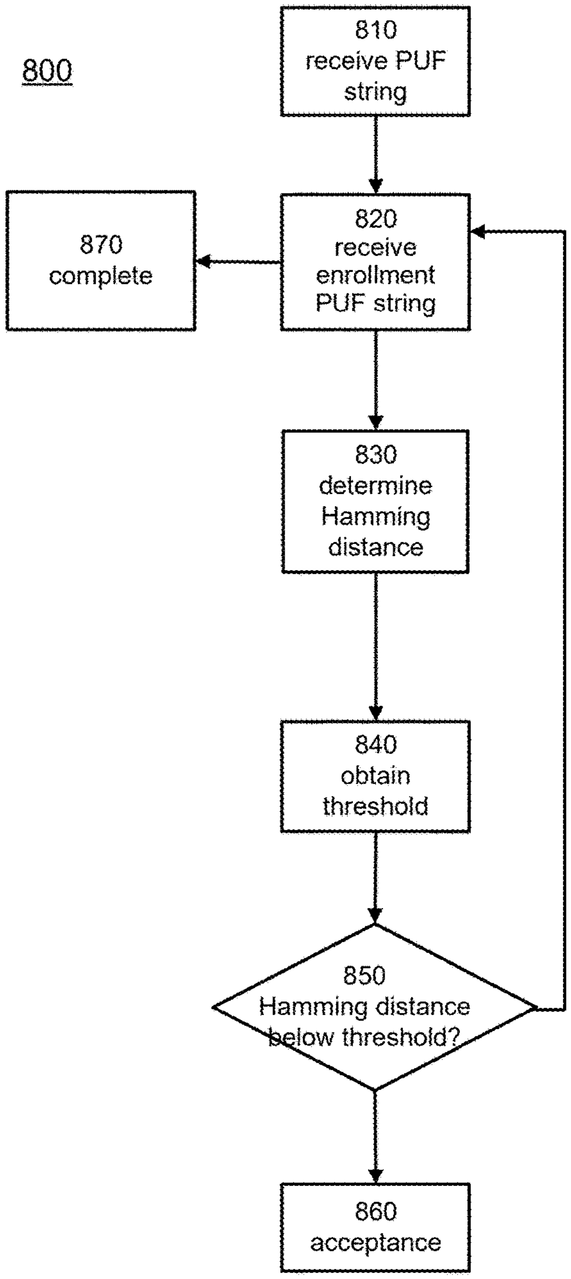

FIG. 8*a* schematically shows an example of an embodiment of an identification method 800 for matching a received PUF string against a database. The database comprising multiple previously obtained enrollment PUF strings of multiple external PUF devices. Method 800 comprises

- receiving (810) the PUF string, the PUF string having been obtained by measuring an external PUF device,
- retrieving (820) an enrollment PUF string retrieved from the database. If there are no enrollment strings left to try, the method may proceed to the non-acceptance state 870.
- determining (830) a Hamming distance between the received PUF string and the enrollment string
- obtaining (840) a threshold depending on the specific retrieved enrollment PUF string and/or the received PUF string
- determining (850) if the Hamming distance is below the obtained threshold, and if so, conclude (860) acceptance. If not continue the search with a next enrollment string in 820.
- if searching completes (870) without accepting the received PUF string, conclude non-acceptance.

Various variants are possible. For example, the obtaining the dependent threshold may be done before determining the Hamming distance. Obtaining the dependent threshold may comprise retrieving the dependent threshold, e.g., from the database. Obtaining the dependent threshold may comprise computing the dependent threshold by applying a threshold setting function to the enrollment PUF string and/or to the received PUF string.

For example, after finding a match, the identification device may continue searching the database to determine if there are further matches. If so, the match with the lowest Hamming Distance to the Enrollment PUF string may be accepted.

Figure 8B:
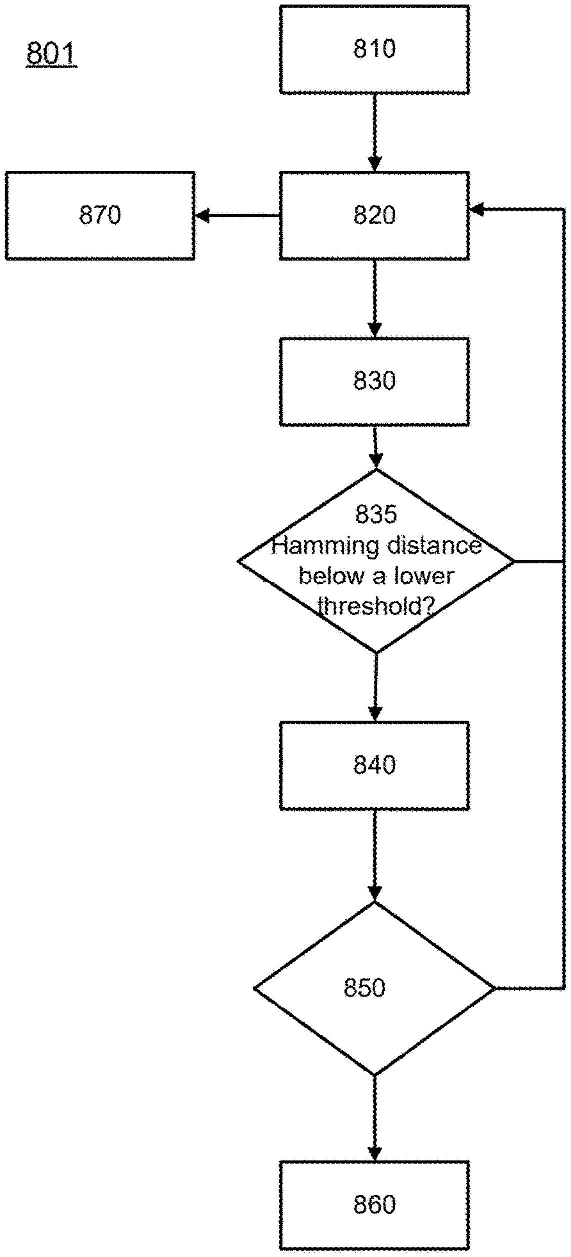

FIG. 8*b* schematically shows an example of an embodiment of an identification method 801 for matching a received PUF string against a database. Method 801 is similar to method 800 but comprises an additional part 835. Method 801 comprises

- receiving (810) the PUF string, the PUF string having been obtained by measuring an external PUF device,
- retrieving (820) an enrollment PUF string retrieved from the database. If there are no enrollment strings left to try, the method may proceed to the non-acceptance state 870.
- determining (830) a Hamming distance between the received PUF string and the enrollment string
- determining (835) if the Hamming distance is below a lower threshold. If the Hamming distance is not below the lower threshold, then the search can continue with retrieving the next enrollment PUF string to try.
- if the Hamming distance is below the lower threshold, then obtaining (840) a threshold depending on the specific retrieved enrollment PUF string and/or the received PUF string.
- determining (850) if the Hamming distance is below the obtained threshold, and if so, conclude (860) acceptance. If not continue the search with a next enrollment string in 820.
- if searching completes (870) without accepting the received PUF string, conclude non-acceptance.

Acceptance action 860 may comprise sending information back to the PUF device that provided the received PUF string. In particular, a fixed device identifier may be provided to the PUF device. Non-accept action 870 may comprise an enrollment action. The enrollment action may comprise generating a unique device identifier for said PUF device and storing the received PUF strings as an enrollment PUF string together with the generated unique device identifier. The unique device identifier may also be sent to the PUF device.

Many different ways of executing the methods are possible, as will be apparent to a person skilled in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, determining a Hamming distance and obtaining a threshold may be executed, at least partially, in parallel. Moreover, a given step may not have finished completely before a next step is started.

Embodiments of the method may be executed using software, which comprises instructions for causing a processor system to perform method 800 or 801. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 9A:
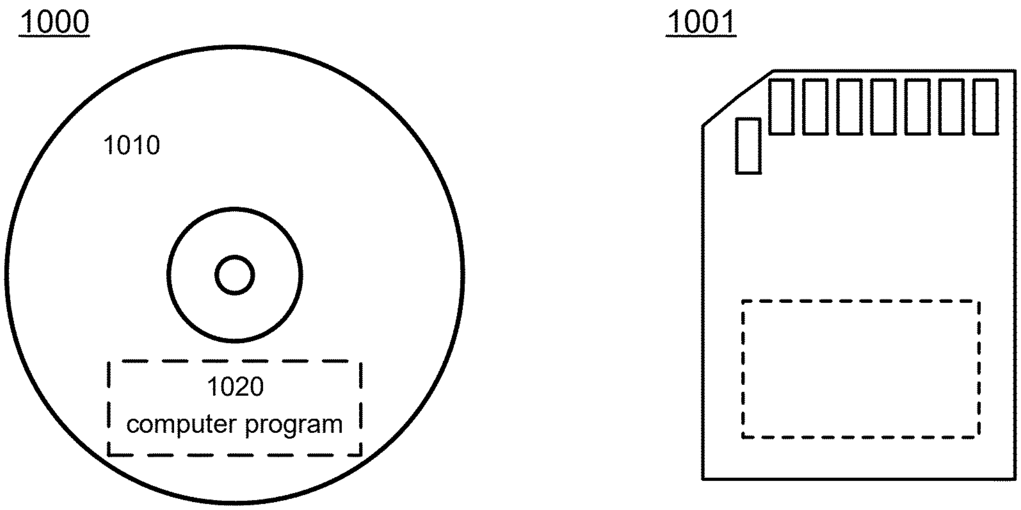

FIG. 9*a* shows a computer readable medium 1000 having a writable part 1010 comprising a computer program 1020, the computer program 1020 comprising instructions for causing a processor system to perform an identification method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said identification method.

Figure 9B:
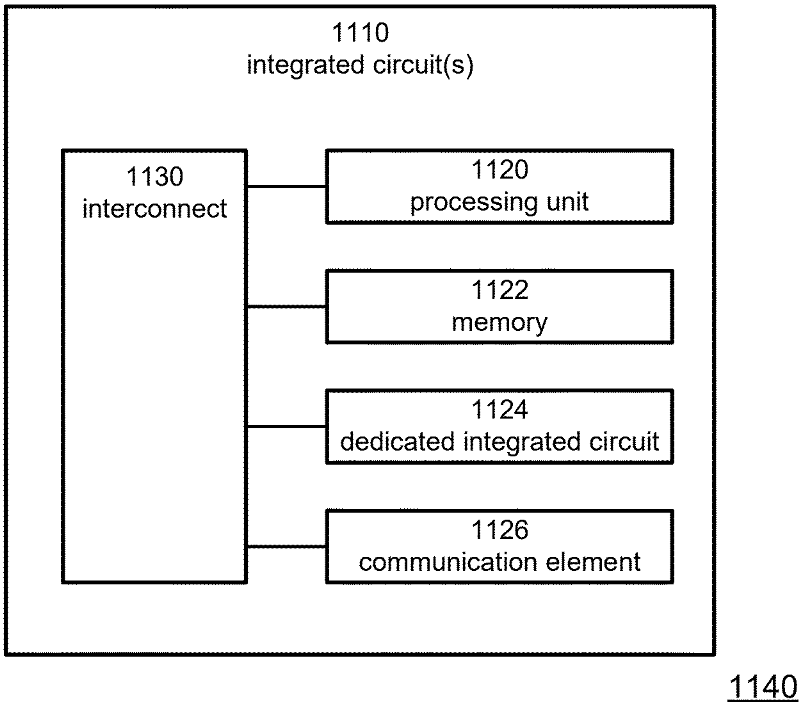

FIG. 9*b* shows in a schematic representation of a processor system 1140 according to an embodiment of an identification device. The processor system comprises one or more integrated circuits 1110. The architecture of the one or more integrated circuits 1110 is schematically shown in FIG. 9*b*. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the identification device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex MO. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

For example, the software may comprise computer instructions arranged for part of all of the actions of: receiving a PUF string, retrieving an enrollment PUF string, determining a Hamming distance between the received PUF string and the enrollment string, obtaining a threshold depending on the specific retrieved enrollment PUF string and/or the received PUF string, determining if the Hamming distance is below the obtained threshold, and if so, concluding non-acceptance if searching completes without accepting the received PUF string.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims, references in parentheses refer to reference signs in drawings of exemplifying embodiments or to formulas of embodiments, thus increasing the intelligibility of the claim. These references shall not be construed as limiting the claim.

The invention claimed is:

1. A method comprising:

receiving a physical unclonable function (PUF) string, the received PUF string having been obtained by measuring an external PUF device;

searching, by a processor system, for a matching enrollment PUF string in a database, the database comprising multiple previously obtained enrollment PUF strings of multiple external PUF devices, said searching comprising iteratively determining if a Hamming distance between the received PUF string and an enrollment PUF string retrieved from the database is below a dependent threshold for the retrieved enrollment PUF string, wherein the dependent threshold for the retrieved enrollment PUF string depends on a 1-probability of bits in the retrieved enrollment PUF string;

wherein an upper threshold is defined at least as large as the dependent thresholds used in searching, said searching further comprising:

determining if the Hamming distance between the received PUF string and an enrollment PUF string retrieved from the database is below the upper threshold, and in response to determining that the Hamming distance is below the upper threshold, determining the dependent threshold for the retrieved enrollment PUF string; and responsive to finding a matching enrollment PUF string in the database, provisioning the external PUF device based on information stored in the database with the matching enrollment PUF string.

2. The method of claim 1, wherein the dependent threshold for the retrieved enrollment PUF string is determined by applying a function to the retrieved enrollment PUF string.

3. The method of claim 1, further comprising repeatedly retrieving an enrollment PUF string from the database, and determining the dependent threshold from the retrieved enrollment PUF string, or retrieving the dependent threshold from the database, the dependent threshold being stored in the database associated with the enrollment PUF string.

4. The method of claim 1, wherein the searching further uses a lower threshold, part of the retrieved enrollment PUF strings being associated with the lower threshold.

5. The method of claim 1, wherein; a particular PUF device is associated with a deviance, the deviance is an average absolute difference between the 1-probability of a bit and ½, and the dependent threshold for the retrieved enrollment PUF string depends on a measure for the average deviance determined from the retrieved enrollment PUF string.

6. The method of claim 5, further comprising:

computing the measure for the deviance from the retrieved enrollment PUF string, and computing the dependent threshold from the measure.

7. The method of claim 5, wherein the dependent threshold is non-increasing for increasing deviance.

8. The method of claim 5, wherein two or more dependent thresholds are associated with two or more ranges of the measure of deviance.

9. The method of claim 1, further comprising:

determining for the retrieved enrollment PUF string, an equal pair probability or an unequal pair probability, and deriving the dependent threshold from the equal pair probability or the unequal pair probability.

10. The method of claim 1, further comprising at least one of:

reporting information stored in the database associated with the matching enrollment PUF string, sending information stored in the database associated with the matching enrollment PUF string to the external PUF device corresponding to the received PUF string, logging information related to the external PUF device in the database associated with the matching enrollment PUF string, and adding the received PUF string to the database in case no matching enrollment PUF string is found.

11. The method of claim 1, further comprising determining a fixed identifier for the external PUF device.

12. The method of claim 11, wherein determining the fixed identifier comprises at least one of:

if a matching enrollment PUF string is found, applying a function to at least part of the matching enrollment PUF string, the fixed identifier comprising at least part of the function output, if a matching enrollment PUF string is found, retrieving a fixed identifier associated with the matching enrollment PUF string from the database, if a matching enrollment PUF string is not found, adding the received PUF string to the database, and if a matching enrollment PUF string is not found, generating a fixed identifier and storing the fixed identifier in association with the received PUF string in the database.

13. The method of claim 11, further comprising:

sending the determined fixed identifier to the external PUF device, and logging information related to the external PUF device in the database associated with the fixed identifier.

14. The method of claim 1, wherein the received PUF string is obtained from a measured PUF response from a PUF in a corresponding PUF device, and at least one of:

the PUF comprises a volatile memory, and the PUF response comprises start-up noise of the volatile memory, or the PUF is a Bus keeper PUF, or a Butterfly PUF.

15. A device comprising:

a communication interface configured for receiving a physical unclonable function (PUF) string, the received PUF string having been obtained by measuring an external PUF device, a database interface configured for accessing a database, the database comprising multiple previously obtained enrollment PUF strings of multiple external PUF devices, and a processor system configured for searching for a matching enrollment PUF string in the database, said searching comprising iteratively determining if a Hamming distance between the received PUF string and an enrollment PUF string retrieved from the database is below a dependent threshold for the retrieved enrollment PUF string, wherein the dependent threshold for the retrieved enrollment PUF string depends on a 1-probability of bits in the retrieved enrollment PUF string; and further configured for, responsive to finding a matching enrollment PUF string in the database, provisioning the external PUF device based on information stored in the database with the matching enrollment PUF string; and wherein an upper threshold is defined at least as large as the dependent thresholds used in searching, said searching further comprising:

determining if the Hamming distance between the received PUF string and an enrollment PUF string retrieved from the database is below the upper threshold, and in response to determining that the Hamming distance is below the upper threshold, determining the dependent threshold for the retrieved enrollment PUF string.

16. The device of claim 15, wherein the dependent threshold for the retrieved enrollment PUF string is determined by applying a function to the retrieved enrollment PUF string.

17. The device of claim 15, wherein the processor system is further configured for repeatedly retrieving an enrollment PUF string from the database, and determining the dependent threshold from the retrieved enrollment PUF string, or retrieving the dependent threshold from the database, the dependent threshold being stored in the database associated with the enrollment PUF string.

18. A non-transitory computer readable medium comprising stored instructions, which when executed by a processor system, cause the processor system to:

receive a physical unclonable function (PUF) string, the received PUF string having been obtained by measuring an external PUF device;

search for a matching enrollment PUF string in a database, the database comprising multiple previously obtained enrollment PUF strings of multiple external PUF devices, said searching comprising iteratively determining if a Hamming distance between the received PUF string and an enrollment PUF string retrieved from the database is below a dependent threshold for the retrieved enrollment PUF string, wherein the dependent threshold for the retrieved enrollment PUF string depends on a 1-probability of bits in the retrieved enrollment PUF string;

wherein an upper threshold is defined at least as large as the dependent thresholds used in searching, said searching further comprising:

determining if the Hamming distance between the received PUF string and an enrollment PUF string retrieved from the database is below the upper threshold, and in response to determining that the Hamming distance is below the upper threshold, determining the dependent threshold for the retrieved enrollment PUF string; and responsive to finding a matching enrollment PUF string in the database, provision the external PUF device based on information stored in the database with the matching enrollment PUF string.

* * * * *